(12) United States Patent
Knausz

(10) Patent No.: US 11,320,935 B1
(45) Date of Patent: May 3, 2022

(54) TOUCH SENSORS WITH MULTI-STATE ELECTRODES

(71) Applicant: IDEX Biometrics ASA, Oslo (NO)

(72) Inventor: Imre Knausz, Fairport, NY (US)

(73) Assignee: IDEX BIOMETRICS ASA, Oslo (NO)

( * ) Notice: Subject to any disclaimer, the term of this patent is extended or adjusted under 35 U.S.C. 154(b) by 0 days.

(21) Appl. No.: 17/104,918

(22) Filed: Nov. 25, 2020

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05); *G06F 3/04164* (2019.05); *G06F 2203/04107* (2013.01)

(58) Field of Classification Search
CPC .............. G06K 9/00006; G06K 9/0002; G06F 3/04166; G06F 3/0466
See application file for complete search history.

(56) References Cited

U.S. PATENT DOCUMENTS

| | | | |
|---|---|---|---|
| 6,055,324 A | 4/2000 | Fujieda | |
| 6,400,427 B1 | 6/2002 | Hanazawa et al. | |
| 6,512,381 B2 | 1/2003 | Kramer | |
| 7,110,577 B1 | 9/2006 | Tschudi | |
| 7,251,351 B2 | 7/2007 | Mathiassen et al. | |
| 7,623,194 B2 | 11/2009 | Lin | |
| 8,994,690 B2 | 3/2015 | Shi et al. | |
| 9,229,281 B2 | 1/2016 | Chen et al. | |
| 9,990,533 B2 | 6/2018 | Pi et al. | |
| 10,203,816 B2 | 2/2019 | Nelson et al. | |
| 10,203,827 B2 | 2/2019 | Nelson et al. | |
| 2011/0051027 A1 | 3/2011 | Shin et al. | |
| 2013/0021294 A1* | 1/2013 | Maharyta | G06F 3/0446 345/174 |
| 2017/0213065 A1 | 7/2017 | Kurasawa et al. | |
| 2017/0322669 A1* | 11/2017 | Hotelling | G06F 3/04166 |
| 2021/0200414 A1* | 7/2021 | Lee | G06F 3/04166 |

* cited by examiner

*Primary Examiner* — Priyank J Shah
(74) *Attorney, Agent, or Firm* — Rothwell, Figg, Ernst & Manbeck, P.C.

(57) ABSTRACT

In some embodiments, a method for detecting a portion of a user's body may be provided. The method may be performed by a system comprising a plurality of cells, each cell of the plurality of cells comprising a transmit electrode and a receive electrode. The method may include, in a first timeslot, applying a first driving signal to the transmit electrode of a first cell, and receiving a first measurement signal using the receive electrode of the first cell. The method may further include, in a second timeslot, applying a second driving signal to the transmit electrode of the first cell, and receiving a second measurement signal using the receive electrode of the first cell. The second driving signal may be inverted relative to the first driving signal.

20 Claims, 17 Drawing Sheets

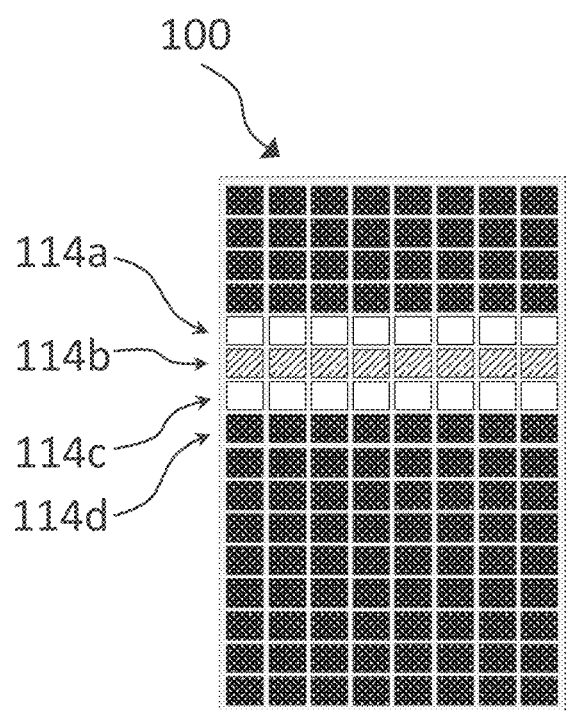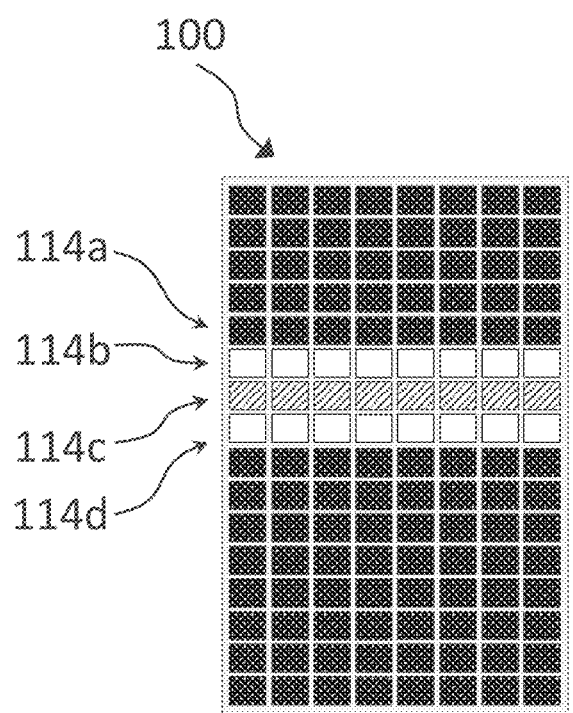

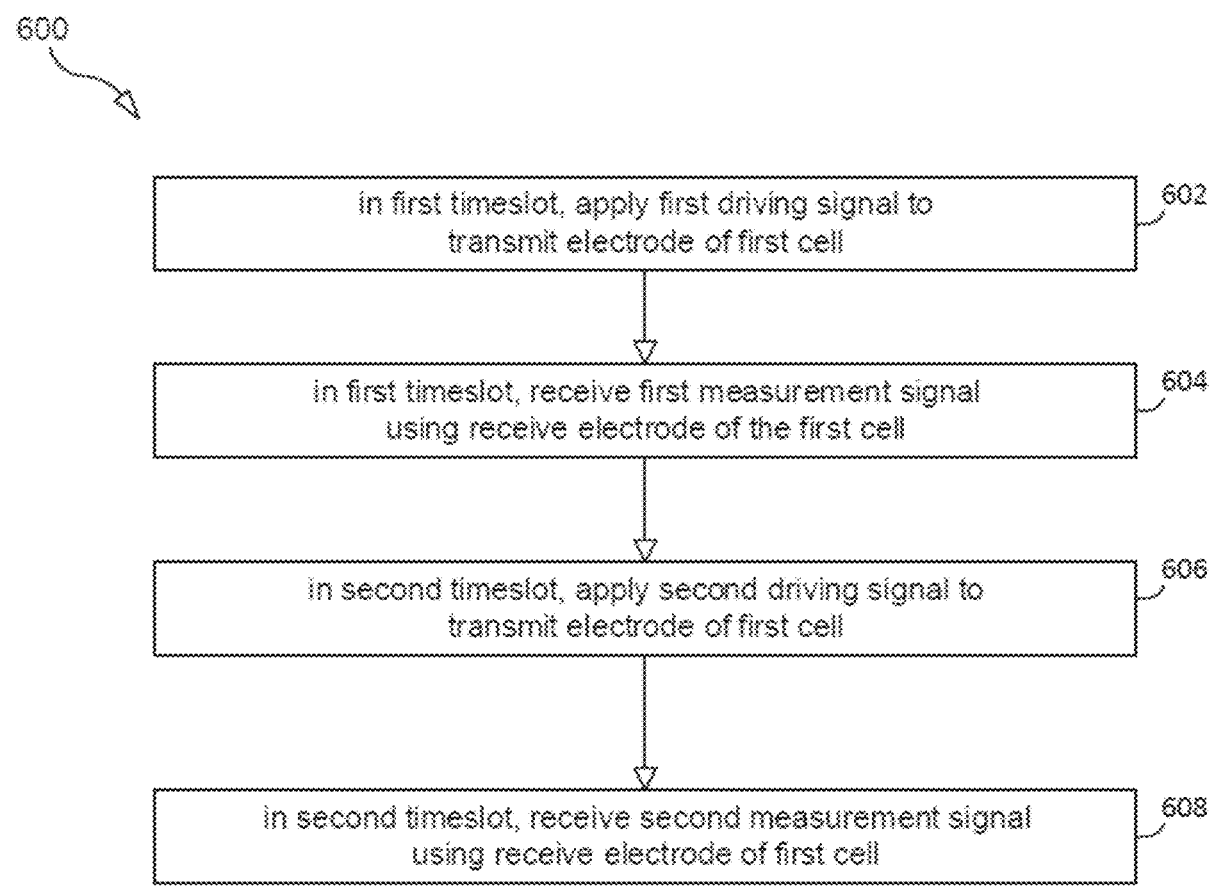

TOUCH SENSORS WITH MULTI-STATE ELECTRODES

FIELD OF THE DISCLOSURE

This disclosure relates to sensors for the electronic sensing of objects located near or about a sensor, such as a position of a finger or features thereof.

BACKGROUND

Sensors may be used for detecting the presence of objects located near or about a sensor. Such sensors can be configured to sense electrical characteristics of an object in order to sense presence or location of an object near or about the sensor, physical characteristics of the object, shapes, textures on surfaces of an object, material composition, biological information, and other features and characteristics of an object being sensed. For example, a sensor may be configured to detect the presence or position of a user's finger, or in the exemplary case of a fingerprint sensor, one or more features (for example, ridges) of a user's finger.

Capacitive touch sensors (as used herein, the term "touch sensor" encompasses any sensor that is configured to detect the presence or position of a finger or other portion of a user's body, and includes but is not limited to fingerprint sensors) may be designed as mutual capacitance sensors or self-capacitance sensors. In some self-capacitance sensors, a grid of electrodes may be arranged, where each electrode represents a respective pixel. Self-capacitance sensors may offer superior image quality relative to mutual capacitance sensors, among other benefits. Self-capacitance sensors have had limitations, however, insofar as they have typically required drive rings or dedicated electrodes which apply a driving signal to the user's finger. These drive rings and/or dedicated drive electrodes can increase the size and cost of the sensor, and when incorporated within the sensor grid, they can create regions of the sensor that are not responsive to touch. Additionally, in embodiments where every pixel corresponds to an independent electrode, it can be difficult to route the received signals from each electrode to receiving circuitry for analysis, particularly as the size of the sensor grid increases.

Accordingly, there is a need for self-capacitance sensors that can be operated without the use of a drive ring or dedicated drive electrodes, and which may also provide for improved signal routing.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

In some embodiments, a method for detecting a portion of a user's body may be provided. The method may be performed by a system comprising a plurality of cells, each cell of the plurality of cells comprising a transmit electrode and a receive electrode. The method may include, in a first timeslot, applying a first driving signal to the transmit electrode of a first cell, and receiving a first measurement signal using the receive electrode of the first cell. The method may further include, in a second timeslot, applying a second driving signal to the transmit electrode of the first cell, and receiving a second measurement signal using the receive electrode of the first cell. The second driving signal may be inverted relative to the first driving signal.

In another embodiment, a system for detecting a portion of a user's body may be provided. The system may include a plurality of cells comprising at least a first cell and a second cell. In some embodiments, each cell of the plurality of cells may include a respective transmit electrode that is configured to selectively apply a first driving signal. The respective transmit electrode may be further configured to selectively apply a second driving signal that is inverted relative to the first driving signal. In some embodiments, each cell of the plurality of cells may further include a respective receive electrode. The system may be configured to apply, in a first timeslot, the first driving signal to the transmit electrode of the first cell, and receive, in the first timeslot, a first measurement signal using the receive electrode of the first cell. The system may be further configured to apply, in a second timeslot, the second driving signal to the transmit electrode of the first cell, and receive, in the second timeslot, a second measurement signal using the receive electrode of the first cell.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

FIGS. 4A and 4B illustrate a sensor in which another exemplary modulation technique is used to perform measurements.

FIG. 15 illustrates an exemplary method 600 for detecting a portion of a user's body or other element.

DETAILED DESCRIPTION

Figure 1:
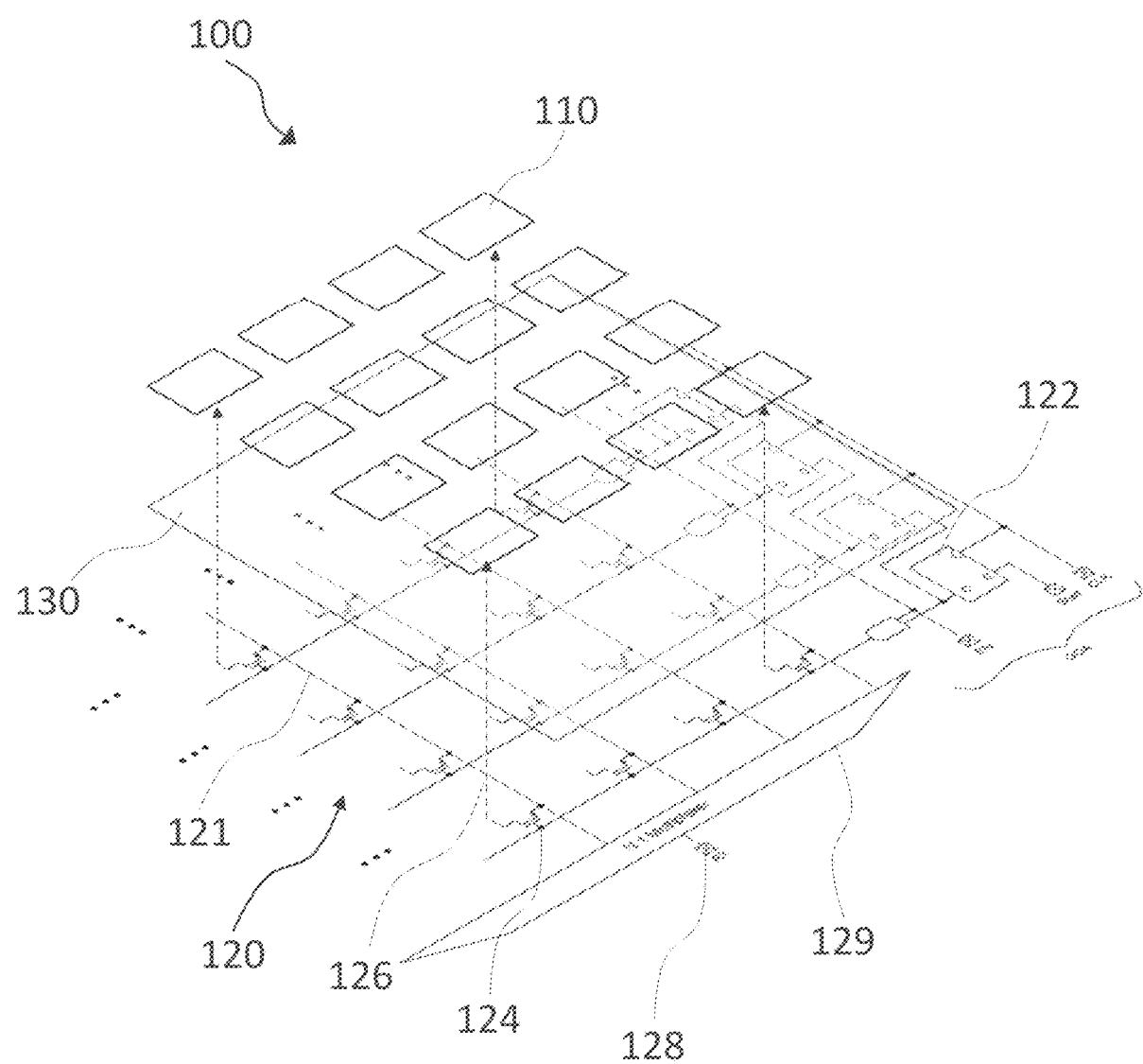
FIG. 1 depicts an exemplary schematic of a touch sensor.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being next to or adjoining.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

As used herein, the term "noise" broadly includes disturbances generated by any of various random processes (e.g., flicker noise, shot noise) and also to interference that is substantially not correlated with the signals being acquired nor with the acquisition method.

The present disclosure may be incorporated into any suitable sensor, as will be understood by those of skill in the art. Such exemplary sensors may include touch screens, fingerprint sensors, or other sensors configured to detect the position of an object or feature thereof. For purposes of illustration, and not by way of limitation, the disclosure below discusses embodiments of two-dimensional sensors configured to detect the location of a user's finger or portion thereof.

In sensors such as touch screens and fingerprint sensors, noise can interfere with measurement accuracy. It is therefore desirable to minimize noise to the extent possible. For example, in U.S. Pat. No. 9,779,280, which is incorporated by reference herein in its entirety, a system combining reference and compensation electrodes with differential amplifiers is used to improve the rejection of typical conducted and radiated noise sources found in sensors such as fingerprint sensors. As disclosed in U.S. patent application Ser. Nos. 15/869,214 and 16/108,875, signals corresponding to groups of pixels may be modulated and demodulated according to patterns in order to compensate for common mode noise. Disclosed in the present application are sensors and modulation techniques that can be used to obtain data with improved signal-to-noise ratio (SNR) and/or signal-to-interference ratio (SIR), and at reduced cost. These sensors and modulation techniques may optionally be used in combination with the techniques disclosed in U.S. Pat. No. 9,779,280 and U.S. patent application Ser. Nos. 15/869,214 and 16/108,875.

FIG. 1 depicts an exemplary schematic of a touch sensor 100. In this embodiment, the sensor 100 is illustrated as a self-capacitance sensor with an active substrate. The sensor may include one or more electrodes 110, which may be configured to capacitively couple to a user's finger or other element to be sensed. The resulting signal from the one or more electrodes 110 may be transmitted to a receiver 128, which may be, in some embodiments, an analog front end (AFE).

In some embodiments, one or more receivers 128 may be arranged to receive signals from a number of electrodes 110. In such cases, it may be advantageous to provide circuitry so that the source of any given signal may be determined, thereby allowing the received signal to be mapped against a corresponding location in a sensor grid. In some embodiments, a control layer 120 may include one or more gate drivers 122, which may be arranged to selectively apply signals to toggle switches 124 between open and closed states. In some embodiments, one or more of the switches 124 may be thin film transistors (TFTs). Each electrode 110 may be connected to a source line 121 of the control layer 120 by a respective via 126 which may lead to a terminal of a respective switch 124. Thus, when the respective switch 124 is in a closed state (which may be controlled by a gate driver 122), a signal received by the electrode 110 may pass to the receiver 128. Conversely, when the respective switch 124 is in an open state, the signal received by the electrode may not pass to the receiver 128. In this manner, electrodes or groups of electrodes (e.g., rows, columns, or other groupings) may be sampled in respective timeslots, and the resulting data may be accurately mapped to the location from which the signals were received. Optionally, the received signals may pass through a multiplexer 129 before they are passed to the receiver 128.

In order to reduce parasitic coupling between the electrodes 110 and the source lines 121, an optional shield layer 130 may be provided, in some embodiments, between the electrode layer and the control layer 120. In some embodiments, the vias 126 may pass through holes in the shield layer 130 so that signals from the electrodes 110 may be passed to the control layer 120.

A sensor such as that illustrated in FIG. 1 may detect the presence of an object (e.g., a user's finger or other element) by measuring capacitance between a respective electrode 110 and the object. There are a number of ways that this capacitance can be measured. In some embodiments, a driving signal may be applied to the object such that a voltage differential exists between the object and the one or more electrodes that are sampled in a given timeslot. In some embodiments, one or more dedicated structures apply this driving signal, such as one or more dedicated driving electrodes within the sensing area or a ring that partially or fully surrounds the sensing area or grid of the sensing electrodes. These dedicated structures, however, may negatively impact the cost, size, and sensitivity of the sensor.

In preferred embodiments, one or more of the electrodes 110 may be used to provide a voltage differential between the object and one or more electrodes 110 that will be sampled in a given timeslot. In still other embodiments, a driving signal may be applied to one or more electrodes immediately adjacent to an electrode to be sampled in a given timeslot such that the presence of an object in the vicinity of the sampled electrodes will modulate the mutual capacitance between the sampled electrodes and the adjacent electrodes to which the driving signal has been applied. These and other techniques are described in detail herein.

FIGS. 2A and 2B, 3, 4A, and 4B illustrate exemplary sensors in which some or all of the electrodes have multiple states. In some embodiments, the multiple states may include a first state in which a driving signal is applied to the respective electrode and a second state in which said driving signal is not applied to the respective electrode. Additional states and sub-states may be provided, as described in greater detail below. In some embodiments, all of the electrodes within a sensing area of the sensor may have multiple states. In other embodiments, only some of the electrodes may have multiple states, while others may be dedicated driving, dedicated sensing, or dedicated ground electrodes.

In each of FIGS. 2A and 2B, 3, 4A, and 4B, electrodes shown in white may be grounded in a respective timeslot, electrodes shown in stripes may be in a sensing state in a respective timeslot, and electrodes shown in black with white dots may be driven in a respective timeslot. As reflected in these figures, the electrodes of a sensor may be divided into logical groups, which may be in sensing states, driven, or grounded together in any given timeslot. Although these figures illustrate rows of electrodes being in sensing states, driven, or grounded together, any other suitable logical grouping scheme may be used. For example, columns may be used in some embodiments. In other embodiments, electrodes may be grouped into clusters, or the groups may be interleaved or otherwise scattered across the sensor grid.

Figure 2A:
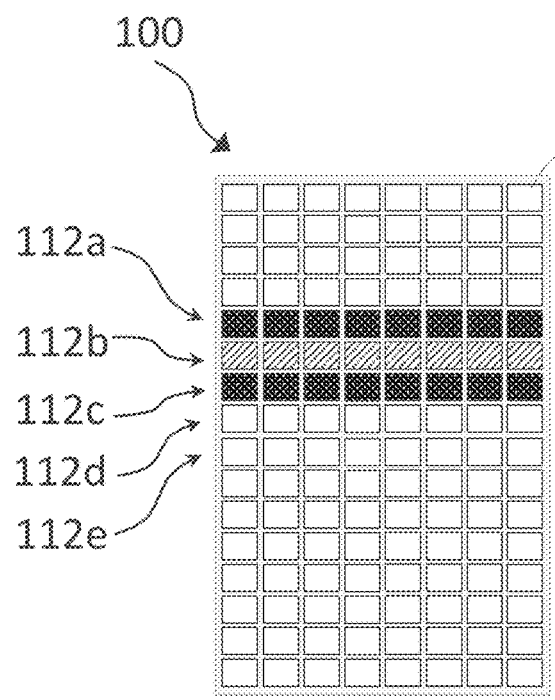
FIGS. 2A and 2B illustrate a sensor in which an exemplary modulation technique is used to perform measurements using the electrodes.
Figure 2B:
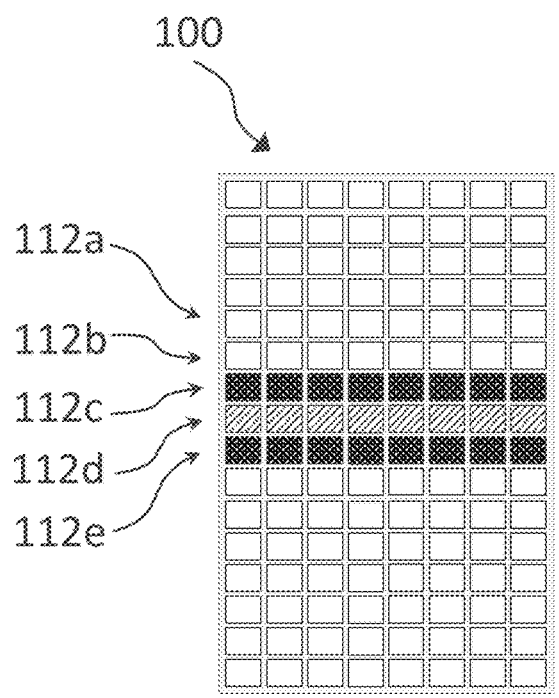

FIGS. 2A and 2B illustrate a sensor in which an exemplary modulation technique is used to perform measurements using the electrodes. FIG. 2A shows a first timeslot according to this modulation technique, and FIG. 2B shows a second timeslot according to this modulation technique. In some embodiments, the two timeslots may be immediately adjacent to one-another (e.g., the first timeslot may immediately precede or immediately follow the second timeslot), though this is not required. For simplicity of explanation, exemplary electrode sets 112a, 112b, 112c, 112d, and 112e are discussed, though other electrode sets (which may be optionally single electrodes, lines of electrodes as illustrated in FIGS. 2A and 2B, or other logical groupings of electrodes) may be included in the modulation technique.

In the first timeslot, illustrated in FIG. 2A, a set of electrodes 112b may be in a sensing state suitable for performing a measurement. In this sensing state, the electrodes of set 112b may be configured to perform a measurement while a driving signal is applied. Application of this driving signal to the electrodes of set 112b may create a voltage differential between these electrodes and the object to be sensed, which may permit a measurable change in capacitance depending upon the proximity of the object (e.g., a ridge of a fingerprint may produce a different value than a valley). In this manner, a measurement may be obtained without the use of a dedicated drive ring or other dedicated drive electrodes. In the first timeslot, illustrated in FIG. 2A, electrode sets 112a, 112c—which may be adjacent to the electrodes of set 112b—may optionally be in a driven but non-sensing state. Providing driven but non-detecting electrodes 112a, 112c immediately adjacent to the driven and detecting electrodes 112b may reduce mutual capacitance between the detecting electrodes of set 112b and one or more grounded electrodes elsewhere on the sensor (e.g., electrode sets 112d, 112e and other electrodes shown in white in FIG. 2A). These surrounding electrode sets (112a, 112c in this timeslot) may thus act as guard lines, which may surround one or more electrodes that are in a sensing state in a given timeslot and help to isolate the signal of interest (here, capacitance between the sensing electrodes and the object to be sensed). The remaining electrodes, shown in white in FIG. 2A, may optionally be in a grounded state in this timeslot. Grounding these electrodes may advantageously conserve power, and it may also reduce the extent to which the driving signal is transferred to the object to be sensed, which may otherwise interfere with the sensor measurements.

In a second timeslot shown in FIG. 2B (which may immediately precede, immediately follow, or be separated from the first timeslot by one or more intervening timeslots) the electrode set 112d may be in the sensing state, such that the electrodes of set 112d may be configured to perform a measurement while a driving signal is applied. Electrode sets 112c and 112e may be guard lines which are in driven but non-sensing states. The remaining electrode sets 112a, 112b, and other electrodes may optionally be in a grounded state.

As will be understood by those of skill in the art, additional sets of electrodes may be in sensing states (or grounded or used as guard lines) in additional timeslots. In some embodiments, electrode sets may be iterated timeslot-by-timeslot until all desired electrodes have been placed in a sensing state. In embodiments where electrode sets are logically grouped by lines, the sensing sets may progress line-by-line across the sensor grid timeslot-by-timeslot until all desired lines have been in a sensing state.

Figure 3:
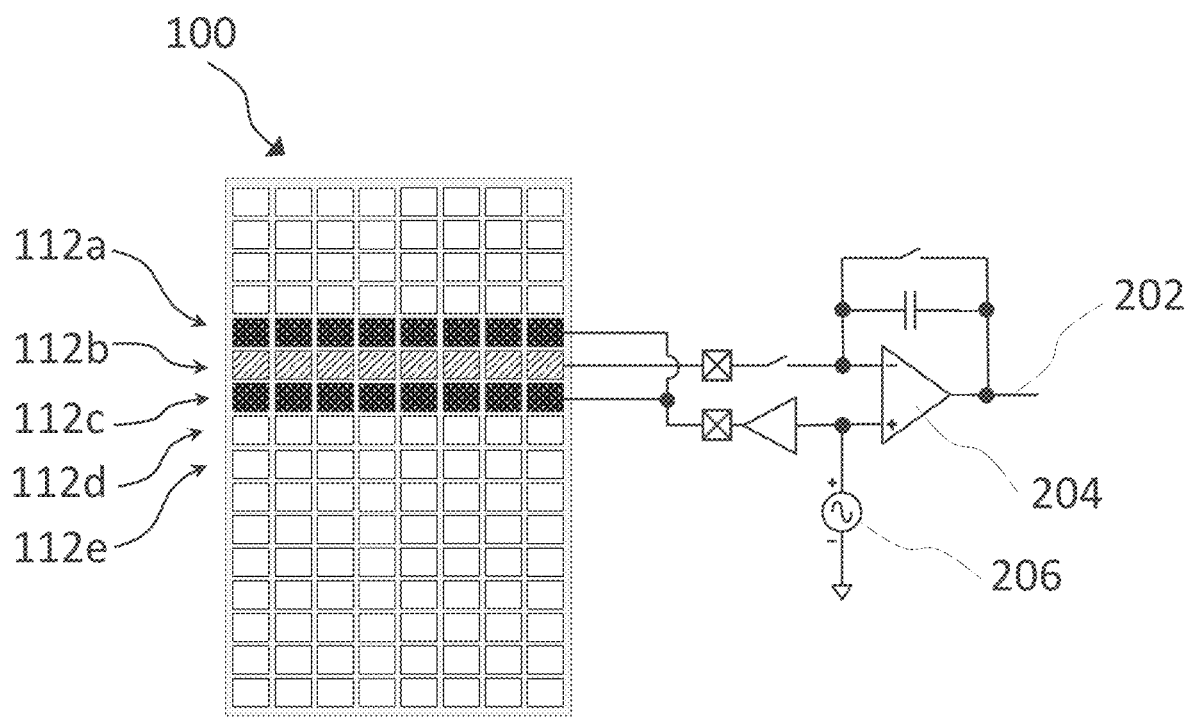
FIG. 3 is a schematic diagram showing exemplary circuitry for providing states such as those shown in FIGS. 2A and 2B.
Figure 6:
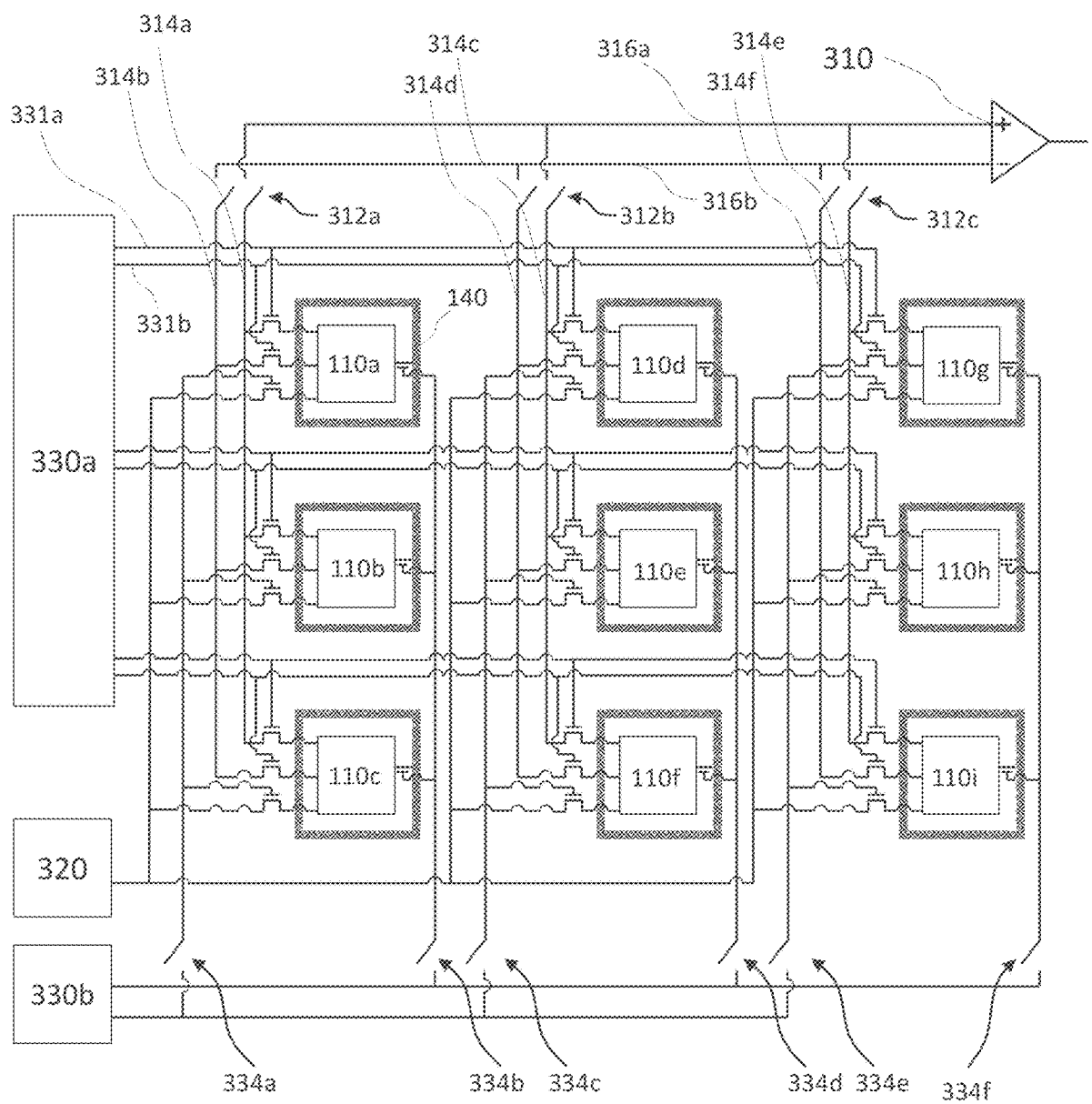
FIG. 6 shows an exemplary schematic of a sensor having a grid of multi-state electrodes.

FIG. 3 is a schematic diagram showing exemplary circuitry for providing states such as those described above with respect to FIGS. 2A and 2B. FIG. 3 depicts the same timeslot as shown in FIG. 2A, though the connections shown in FIG. 3 may be progressively switched to other electrode sets to the sensing, guard, and grounded states to be applied per the modulation technique described above. (FIG. 6 depicts an exemplary switching arrangement which may be used in combination with the circuitry of FIG. 3.) In some embodiments, a driving signal may be applied by a power source 206. The power source 206 may be coupled, directly or indirectly, to the electrodes of sets 112a and/or 112c. The power source 206 may also be coupled to a first terminal of an AFE 204. The electrodes of the second set 112b, which may be in a driven-sensing state in this timeslot, may be coupled to a second terminal of AFE 204. Circuit elements such as a capacitor and/or a reset switch may be provided as a parallel connection between the electrodes of set 112b and the output 202 of AFE 204.

The AFE 204 may be configured to generate an output 202 such that the voltage at the second terminal of the AFE 204 is substantially equal to the voltage at the first terminal of the AFE 204. The magnitude of the output signal 202 necessary to achieve this equivalence may vary based on the proximity of an object to be sensed, which may form a capacitance to the electrodes of set 112b. In this manner, the output 202 may vary depending on the proximity of the object to be sensed. In subsequent timeslots, the first and second terminals may be iteratively coupled to different sets of electrodes, thereby allowing some or all of the electrodes of the sensor grid to perform measurements.

FIGS. 4A and 4B illustrate a sensor in which another exemplary modulation technique is used to perform measurements. FIG. 4A shows a first timeslot according to this modulation technique, and FIG. 4B shows a second timeslot according to this modulation technique. In some embodiments, the two timeslots may be immediately adjacent to one-another (e.g., the first timeslot may immediately precede or immediately follow the second timeslot), though this is not required. For simplicity of explanation, exemplary electrode sets 114a, 114b, 114c, and 114d are discussed, though other electrode sets (which may be optionally single electrodes, lines of electrodes as illustrated in FIGS. 4A and 4B, or other logical groupings of electrodes) may be included in the modulation technique.

In the first timeslot, illustrated in FIG. 4A, a set of electrodes 114b may be in a sensing state. In this sensing state, the electrodes of set 114b may be floating, such that they are receptive to a signal that may be received from (or modulated by) an object to be sensed. The electrodes (including electrode set 114d) shown in black in FIG. 4A may be in a driving state, such that a driving signal is applied to these electrodes during the first timeslot. By applying a driving signal to these electrodes (which may, in some embodiments, represent a majority of the electrodes in the sensor), the object to be sensed may be coupled to the driving signal. In this manner, a voltage differential may be generated between the object and the electrodes of set 114b which may be used to perform a measurement in this timeslot, and the signals received from electrode set 114b may thus be indicative of the presence or proximity of the object.

In the first timeslot, illustrated in FIG. 4A, electrode sets 114a, 114c—which may be adjacent to the electrodes of set 114b—may optionally be in a grounded state. Providing grounded electrodes immediately adjacent to the detecting electrodes 114b may reduce mutual capacitance between the detecting electrodes of set 114b and one or more driving electrodes elsewhere on the sensor (e.g., electrode set 114d and other electrodes shown in white in FIG. 2A). These surrounding electrode sets (114a, 114c in this timeslot) may thus act as guard lines, which may surround one or more electrodes that are in a sensing state in a given timeslot and help to isolate the signal of interest (here, capacitance between the detecting electrodes and the object to be sensed).

In other embodiments, the surrounding rows 114a, 114c may instead be driven. In some embodiments, this may generate a mutual capacitance between the detecting electrodes of set 114b and the driving electrodes of sets 114a, 114c. When an object, such as a user's finger, is proximate to one of the detecting electrodes, this mutual capacitance may be modified. In this manner, the electrodes of set 114b may thus receive both a self-capacitance and a mutual-capacitance signal, both of which may be indicative of the presence or proximity of the object.

In a second timeslot shown in FIG. 4B (which may immediately precede, immediately follow, or be separated from the first timeslot by one or more intervening timeslots) the electrode set 112c may be in the sensing state. In this sensing state, the electrodes of set 114c may be floating, such that they are receptive to a signal that may be received from (or modulated by) an object to be sensed. The electrodes (including electrode set 114a) shown in black in FIG. 4B may be in a driving state, such that a driving signal is applied to these electrodes during the second timeslot. Electrode sets 114b and 114d may be optionally be guard lines which are grounded to aid in isolating a self-capacitance signal. Alternatively, the electrodes of sets 114b and 114d may be driven to produce a mutual-capacitance signal which may be indicative of the presence or proximity of the object.

As will be understood by those of skill in the art, additional sets of electrodes may be in sensing states (or grounded or used as guard lines) in additional timeslots. In some embodiments, electrode sets may be iterated timeslot-by-timeslot until measurements have been collected from all desired electrodes. In embodiments where electrode sets are logically grouped by lines, the sensing sets may progress line-by-line across the sensor grid timeslot-by-timeslot until all desired lines have been placed in a sensing state.

Figure 5:
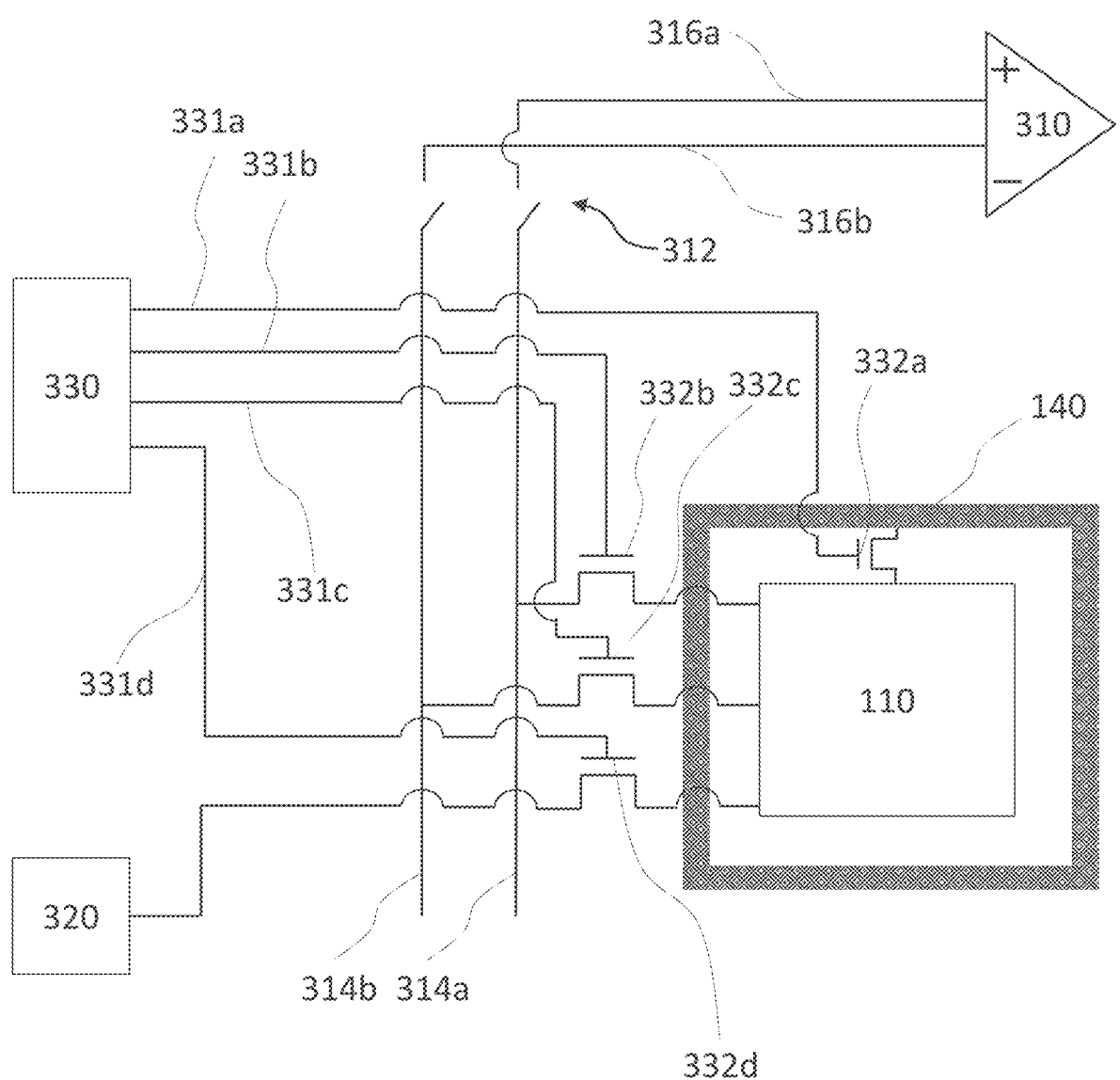
FIG. 5 shows a schematic for an exemplary multi-state electrode.

FIG. 5 shows a schematic for an exemplary multi-state electrode 110. A multi-state electrode such as that shown in FIG. 5 may be used in any appropriate modulation technique, including, but not limited to that described above with reference to FIGS. 4A and 4B. In the illustrated embodiment, the electrode 110 may have four states, each of which may be selectively controlled by switches 332a, 332b, 332c, 332d. When switch 332a is closed, the electrode may be electrically connected to a shield 140. In some embodiments, the shield 140 may help to isolate the electrode 110 from output lines 314a, 314b. In some embodiments, the shield 140 may be coplanar to one, some, or each of the electrodes 110 and the output lines 314a, 314b. In some embodiments, the shield 140 may be grounded. In other embodiments, as discussed in greater detail below (including, but not limited to, with respect to FIGS. 8-11), the shield 140 may be selectively driven or selectively grounded, such that closing switch 332a may selectively cause the electrode 110 to be driven or grounded. When switch 332d is closed, the electrode may be electrically connected to a driving signal applied by a power source 320. In embodiments where the shield may be selectively driven by a power source, switch 332d may optionally be omitted.

When switch 332b is closed, the electrode 110 may be electrically connected to a first output line 314a. When switch 332c is closed, the electrode 110 may be electrically connected to a second output line 314b. As discussed below with reference to FIGS. 6 and 7, the output lines 314a, 314b may be selectively connected to an array of electrodes, for example, along a given row or column of a sensor grid. When the switches 312 corresponding to the output lines 314a, 314b are closed, output line 314a may be connected to a first receive line 316a, and output line 314b may be connected to a second receive line 316b. The two receive lines 316a, 316b may be connected to respective terminals of an AFE 310. For example, receive line 316a may be connected to a positive terminal of AFE 310, and receive line 316b may be connected to a negative terminal of AFE 310. In some embodiments, the AFE 310 may be a differential receiver. In some embodiments, an output from the AFE 310 may indicate a difference between the signals received from output lines 316a and 316b.

In some embodiments, output line 314a may act as a positive output line, while output line 314b may act as a negative output line. This may allow a measurement signal received by electrode 110 to be selectively routed into either a positive terminal or a negative terminal of AFE 310, depending on which of switches 332b, 332c is closed. In the illustrated embodiment, for example, when switch 332b and switch 312 are closed, a signal received by electrode 110 may be transmitted to a positive terminal of AFE 310 (in this case, the electrode 110 may be in a positive sensing state). When switch 332c is closed, a signal received by electrode 110 may be transmitted to a negative terminal of AFE 310 (in this case, the electrode 110 may be in a negative sensing state). The switches 332a, 332b, 332c, 332d may be controlled by one or more gate drivers 330, which may apply signals to the switches by way of gate lines 331a, 331b, 331c, 331d. In some embodiments, a gate driver 330 may selectively close only one of switches 332a, 332b, 332c, 332d in any given time slot. In some embodiments, the switches 332a, 332b, 332c, 332d may be selectively closed in a sequence determined by a modulation pattern, which may include, for example, a code division multiplexing (CDM) pattern.

Although the multi-state electrode 110 of FIG. 5 is shown with four switches corresponding to four states, different numbers of switches or states may be provided. As one example, a single switch could be used to ground, drive, and/or place the electrode in a sensing state, depending on the signal provided along that path. Likewise, in some modulation techniques, it may be unnecessary to ground electrodes, or it may be unnecessary to have multiple sensing states (e.g., a single sensing state may be used instead of positive and negative sensing states). As one example, it may be unnecessary to ground electrodes according to a variant of the modulation technique illustrated in FIGS. 4A and 4B where no guard lines are used, and in this variant, a ground state may optionally be omitted. It is thus permissible to use any combination of the switches and states illustrated in FIG. 5 to suit the needs of any given application.

FIG. 6 shows an exemplary schematic of a sensor having a grid of multi-state electrodes. The multi-state electrodes in FIG. 6 are shown with four states and four switches as described above with reference to FIG. 5. Specifically, each of electrodes 110a-110i may have a ground state, a driving state, a positive sensing state, and a negative sensing state. As discussed above, any of these states may be omitted or modified depending on the needs of any given application.

As illustrated in FIG. 6, each of electrodes 110a-110c, which may be aligned in a first column, may be selectively connected to either of first column output lines 314a, 314b. The first column output lines 314a, 314b may be selectively connected to receive lines 316a, 316b by way of first column switches 312a. The two receive lines 316a, 316b may be connected to respective terminals of an AFE 310. For example, receive line 316a may be connected to a positive terminal of AFE 310, and receive line 316b may be connected to a negative terminal of AFE 310. Each of electrodes 110d-110f, which may be aligned in a second column, may be selectively connected to either of second column output lines 314c, 314d. The second column output lines 314c, 314d may be selectively connected to receive lines 316a, 316b by way of second column switches 312b. Third column electrodes 110g-110i may similarly be connected to receive lines 316a, 316b via switches 312c. Additional rows and columns may be added in the same manner as needed to achieve a desired sensor size or resolution.

By arranging the electrodes in this manner, any given electrode in the grid may be selectively toggled into a positive sensing state or a negative sensing state. Specifically, the column or columns of electrodes from which signals are received in a given timeslot may be controlled by way of switches 312a, 312b, 312c. Meanwhile, rows of electrodes may be selectively coupled to respective output lines 314 in response to control signals from a gate driver 330a. For example, when a signal is applied to gate line 331a, each of the electrodes 110a, 110d, 110g in a first row may be connected to a respective positive output line 314a, 314b, 314c. Similarly, when a signal is applied to gate line 331b, each of the electrodes 110a, 110d, 110g in the first row may be connected to a respective negative output line 314b, 314d, 314f. In either case, the system may control which of the first row electrodes 110a, 110d, 110g is to be in a sensing state in a given timeslot by controlling switches 312a, 312b, 312c. This approach may be used to selectively perform measurements in a positive or negative state from any of electrodes 110a-110i.

In some embodiments, a second gate driver 330b may be used to selectively control ground and/or driving states. In some embodiments, gate driver 330b may selectively control ground and/or driving states on a column-by-column basis. For example, when switch 334a is closed, each of the electrodes 110a, 110b, 110c in the first column may be connected to a power source 320, which may apply a driving signal. Likewise, when switch 334c or switch 334e is closed, the electrodes in the second column or third column may be respectively coupled to the power source, which may apply a driving signal to these electrodes. When switch 334b is closed, each of the electrodes 110a-110c in the first column may be connected to a respective shield 140, which may, in some embodiments, be grounded. Likewise, when switches 334d or 334f is closed, the electrodes in the second column or third column may be respectively coupled to a shield and/or grounded.

Figure 7:
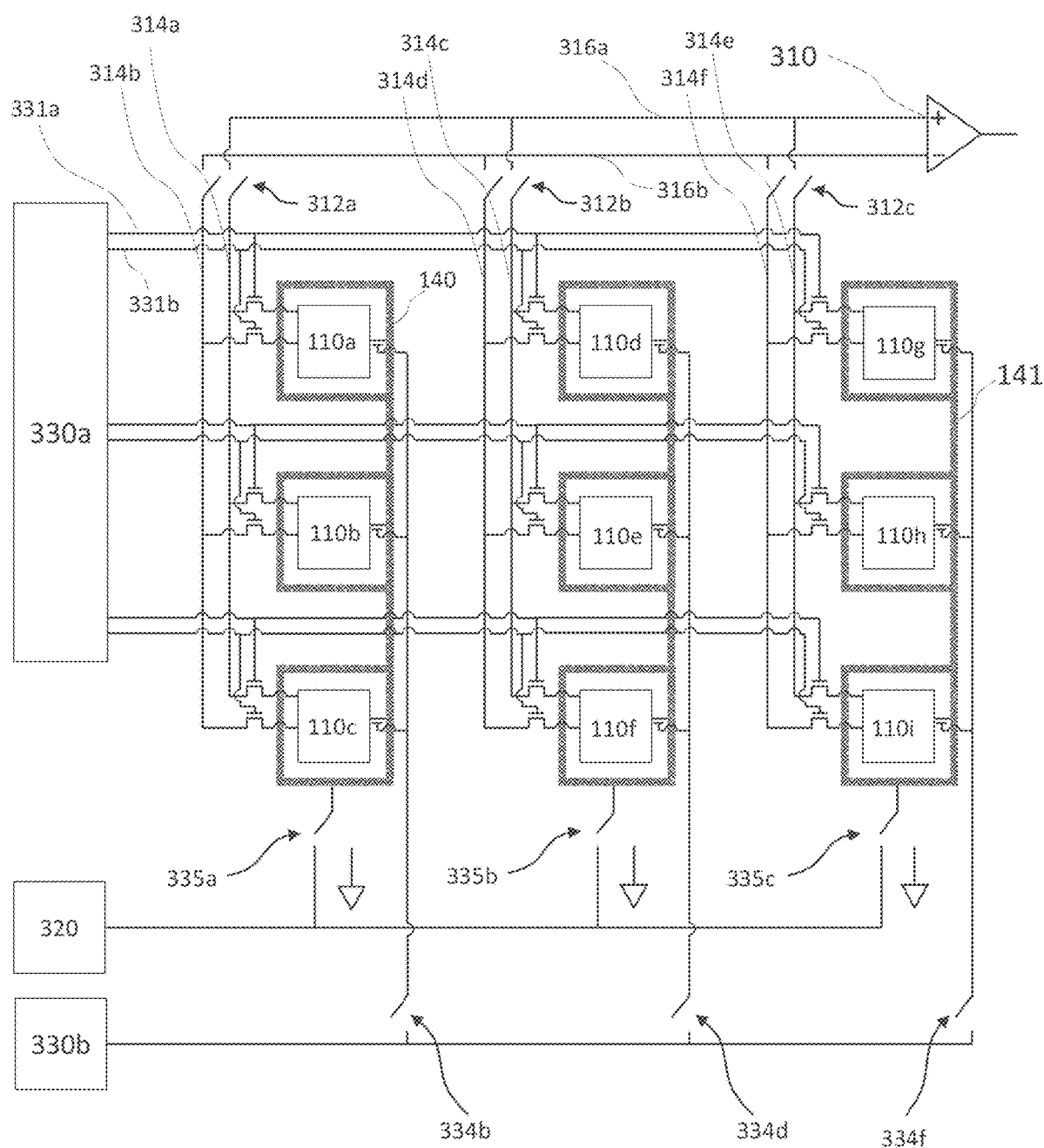
FIG. 7 shows another exemplary schematic of a sensor having a grid of multi-state electrodes.

FIG. 7 shows another exemplary schematic of a sensor having a grid of multi-state electrodes. The arrangement shown in FIG. 7 is similar to that illustrated in FIG. 6, and the description above likewise applies to FIG. 7. As illustrated in FIG. 7, however, shields 140 in a given column may optionally be electrically connected by abutments 141. A first column of shields 140 may be selectively connected by one or more switches 335a to either of power source 320 (which may apply a driving signal) or ground. In this manner, the first column of shields may be used to selectively ground or drive the electrodes 110a-110c of the first column. For example, when switch 334b is closed, each of the electrodes 110a-110c may be electrically connected to their respective shields. By using switch 335a to connect the shields of that column to power source 320, each of electrodes 110a-110c may be driven. Likewise, by using switch 335a to connect the shields of that column to ground, each of electrodes 110a-110c may be grounded. Switches 334d and 335b may be used to selectively ground or drive the electrodes 110d-110f of the second column, and switches 334f and 335c may be used to selectively ground or drive the electrodes 110-g-110i of the third column in the same manner. The same approach may be used to ground or drive as many columns as may be desired in any given application.

Arrangements such as those illustrated in FIGS. 6 and 7 advantageously allows a sensor grid to include any desired number of electrodes without increasing the fraction of the sensor area that must be dedicated to source lines extending between an AFE and the electrodes. This is a significant problem in self-capacitance sensors in which every electrode has a respective source line, since as the number of electrodes in a given row or column increases, an increasingly large number of source lines be run parallel to one-another, occupying an increasingly greater fraction of the available area. By contrast, FIGS. 6 and 7 shows embodiments where any number of electrodes in a given column can be connected to two shared output lines (e.g., all of the electrodes in a first column may be selectively connected output liens 314a, 314b). The density of column and gate lines likewise does not need to increase as the sensor area grows larger.

In some embodiments, a multiplexing pattern may be applied to perform measurements using the electrodes of the sensor grid. In some embodiments, for example, CDM pattern may be applied to collect data from a given column or row of the sensor grid. In some embodiments, the multiplexing patterns may include Hadamard, Legendre, Barker sequences, modifications of these sequences, or other suitable CDM matrices. In some embodiments, the multiplexing patterns may be "balanced" such that for each of the timeslots in the respective pattern, an array of modulation factors corresponding to the respective timeslot (e.g., the values in a given column) may sum to substantially zero. For purposes of illustration, an exemplary balanced 4th-order pseudo-orthogonal pattern is reproduced below:

+1 −1 −1 0
−1 −1 +1 0
−1 +1 −1 0
+1 +1 +1 0

In the above exemplary pattern, the values in each column sum to zero. Additionally, because the values in the right-most column are all 0's, the signals that are applied or received in this timeslot may convey no information and may optionally not be acquired and/or processed. Of course, other suitable patterns may be selected, as will be understood by those of skill in the art.

In some embodiments, a CDM pattern may be applied to perform measurements using the electrodes of a given column. For example, each column of a CDM pattern may represent a given timeslot, and each row of the CDM pattern may represent a modulation factor to be applied to a respective electrode in that timeslot. A modulation factor of +1 may indicate that the respective electrode should be in a positive sensing state. A modulation factor of −1 may indicate that the respective electrode should be in a negative sensing state. A modulation factor of 0 may indicate that the respective electrode should be in a non-sensing state (e.g., not connected to an output line and/or not connected to a receive line). For example, applying the top row of the exemplary CDM pattern above to electrode 110a in FIG. 6 would indicate that: in a first timeslot, electrode 110a should be connected to positive output line 314a; in a second timeslot, electrode 110a should be connected to negative output line 314b; in a third timeslot, electrode 110a should be connected to negative output line 314b; and in a fourth timeslot, electrode 110a should not be connected to either output line (or the data should otherwise not be collected).

Any suitable multiplexing pattern of any suitable order may be used. For example, the multiplexing patterns and sensing/processing techniques described in U.S. patent application Ser. Nos. 15/869,214 and 16/108,875 may be used to perform measurements using electrodes in the sensors illustrated herein, including the embodiments illustrated in FIGS. 6 and 7. In some embodiments, the grouping techniques disclosed in U.S. patent application Ser. Nos. 15/869,214 and 16/108,875 may be applied to the electrodes of sensors such as those illustrated in FIGS. 6 and 7 on a column-by-column basis. In some embodiments, using balanced multiplexing patterns may cause a common mode portion of the resulting signal to be canceled. This may beneficially remove a carrier signal or body-coupled noise from the signal, thereby allowing a greater fraction of the dynamic range of the processing circuitry to be allocated to the measurement signal.

FIGS. 8-11 show exemplary embodiments of multi-state electrodes. FIG. 8A is a plan-view looking down on an exemplary multi-state electrode 110. FIG. 8B shows a cross-sectional view of the same electrode 110 taken at line 8B-8B. A perimeter of the electrode 110 may be surrounded, in whole or in part, by a shield 140a. A surface of the electrode 110 may be unshielded (i.e., in a Z-direction in FIG. 8A and an upward direction in FIG. 8B) such that the electrode 110 may be sensitive to electric field changes caused by the presence of an object to be detected (e.g., a user's finger). In some embodiments, the shield 140 may be comprised of conductive metal. In some embodiments, the shield 140 may be co-planar with one or both of the electrode and an output line 314. For purposes of this disclosure, two structures may be considered to be "co-planar" with one-another if they are deposited in a common layer during manufacture. Co-planar structures need not be precisely parallel to one-another, and indeed, they often will not be precisely parallel to one-another due to manufacturing variances. In some embodiments, the electrode 110 may be selectively connectable with the output line 314 by a switch 332a. In some embodiments, the switch 332a may be controlled by a gate line 331a. In some embodiments, the electrode may be selectively connectable with the shield 140 by a switch 332b.

Figure 8A:
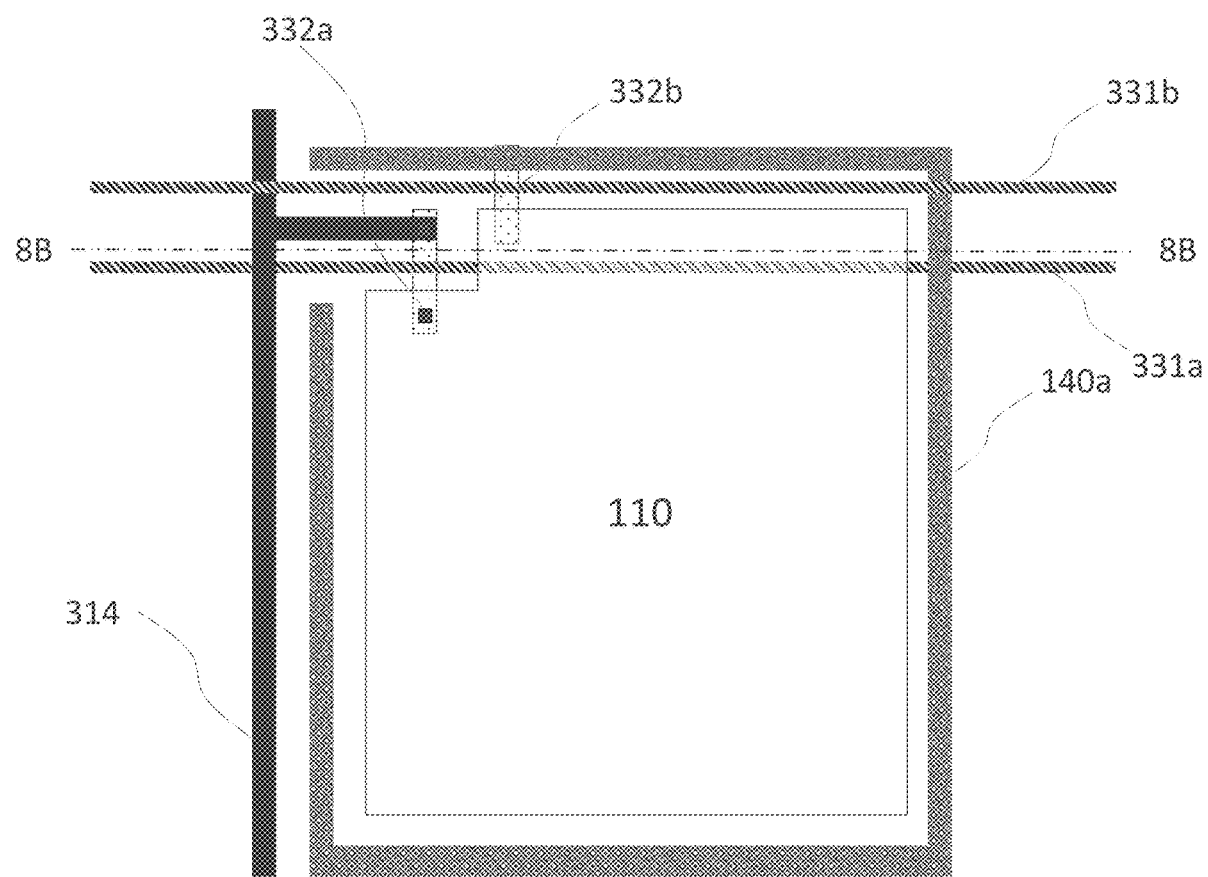
FIG. 8A is a plan-view looking down on an exemplary multi-state electrode 110.
Figure 8B:
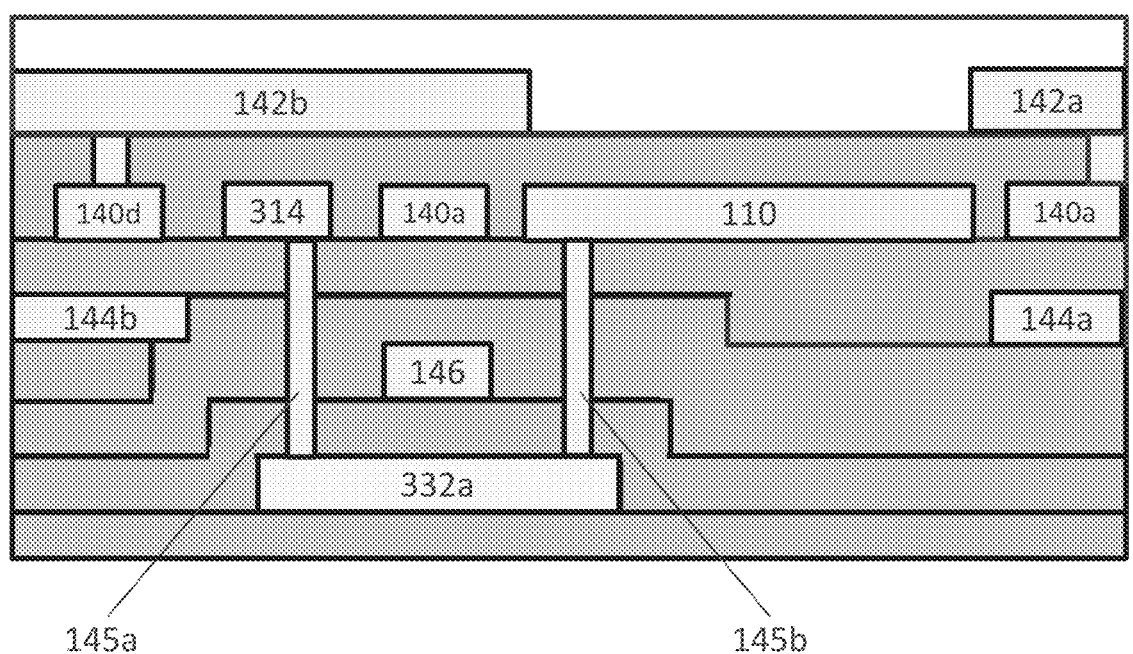
FIG. 8B shows a cross-sectional view of the same electrode 110 taken at line 8B-8B.

FIG. 8B illustrates an exemplary cross-section diagram of the embodiment of FIG. 8A. In some embodiments, electrode 110 may be surrounded on either side by a shield 140a. The electrode may be connected to an output line 314 by way of a switch 332a, which may, in some embodiments, be a transistor 332a. In some embodiments, vias 145a, 145b may be used to connect electrode 110 and output line 314 to switch 332a. In some embodiments, a second switch 332b (shown in FIG. 8A, not shown in FIG. 8B) may selectively connect the electrode 110 to the shield 140a. In some embodiments, the shield 140a may be coplanar to one or both of the electrode 110 and the output line 314. In some embodiments, a shield 140d may be provided on the other side of the output line 314, thereby providing shielding between the output line 314 and an electrode in an adjacent cell (adjacent electrode not shown). In some embodiments, shield 140d may be a co-planar shield (similar to shield 140a) that surrounds or partially surrounds a neighboring electrode. In some embodiments, supplemental shields 142a, 142b, 144a, 144b, 146 may be provided to shield electric field lines that may otherwise extend above or below the coplanar shields 140a, 140d. In some embodiments, one or more of the supplemental shields 142a, 142b, 144a, 144b, 146 may be electrically connected to shields 140. In some embodiments, one, some, or all of supplemental shields 142a, 142b, 144a, 144b, 146 may extend linearly alongside respectively electrode columns. In some embodiments, these shields may be disposed to leave an unobstructed electric field path between electrode 110 and an object to be sensed. Each of these shields is optional, and each may be included or omitted on an individual basis depending on the objectives in a given system. For example, depending on the proximity of the electrodes and output lines and the magnitude of the signals, the extent to which undesired coupling occurs may increase or decrease, thereby increasing or decreasing the extent to which additional shield layers are beneficial and cost-effective. In FIG. 8A, shields 140d, 142a, 142b, 144a, 144b, 146 are not shown to simplify the illustration. These shields may be provided, however, and they may be preferably disposed at the locations indicated by FIG. 8B (e.g., between adjacent electrodes 110, and between electrodes 110 and output lines 314).

The lines in FIG. 8B reflect layers that may be deposited in sequence from the bottom up. That is, the switch 332 may be deposited on a base layer, an interim layer may then be deposited, then shield 146 may be deposited, then another interim layer, then shields 144a and 144b, and so on. Notably, the electrodes 110, shields 140, and output lines 314 may thus be deposited in a single layer using a single manufacturing step. This may advantageously reduce manufacturing cost. Additionally, in embodiments where optional shields 142, 144, 146 are omitted, the manufacturing process may be greatly simplified by making the shield 140 coplanar to the electrodes 110 and output lines 314. In such embodiments, a deposition step may be used to create switches 332 (and/or any associated drive lines), an interim layer may then be deposited, and then the electrodes 110, shields 140, and output lines 314 may be deposited in a single step. This may advantageously permit a simplified sensor stack-up with two metal layers (e.g., a control layer and an electrode/output layer), as compared to the stack-up with three metal layers shown in FIG. 1 (e.g., a control and output layer, an electrode layer, and a shield layer therebetween).

Figure 9:
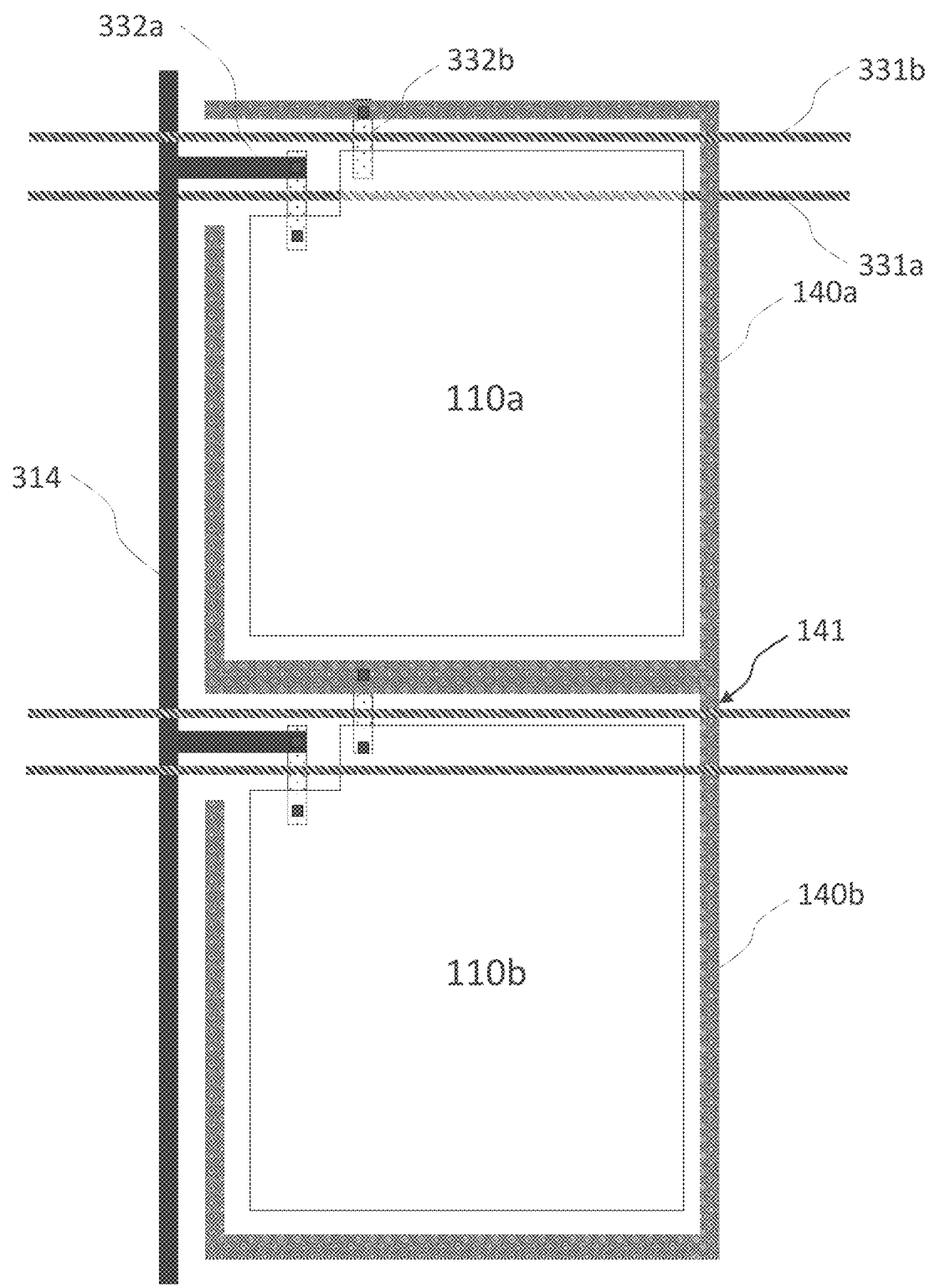
FIG. 9 illustrates another exemplary arrangement for a system having multi-state electrodes.

FIG. 9 illustrates another exemplary arrangement for a system having multi-state electrodes. The embodiment illustrated in FIG. 9 is similar to the embodiments shown in FIGS. 8A-8B, and the corresponding description above likewise applies to FIG. 9. Similar to the embodiments shown in FIGS. 8A-8B, electrodes 110a, 110b (or any number of electrodes, see FIGS. 6-7 for exemplary layouts which may be expanded to include any desired number of electrodes) may be connected to an output line 314 by way of respective switches. In some embodiments, the switches may be controlled by respective gate lines. In some embodiments, electrode 110a, 110b may also be selectively connectable with shields 140a, 140b by respective switches, which may be controlled by respective gate lines. In some embodiments, the shields 140a, 140b may be coplanar to one or both of the electrode 110 and the output line 314.

As illustrated in FIG. 9, shields 140a, 140b, which may correspond to adjacent electrodes 110a, 110b, are electrically connected to one another. In some embodiments, shields 140a, 140b may be connected by an abutment 141, which may join one section of shield 140a to shield 140b. In some embodiments, the shields 140a, 140b may be include a shared portion, or they may be connected by wiring. In some embodiments, some or all of the shields in a row or column may be electrically connected to one-another. For example, FIG. 7 shows an embodiment in which the shields in respective lines of a sensor grid are electrically connected to one another such that a driving signal and/or ground voltage may be applied to the electrodes in the respective lines. The structural arrangement shown in FIG. 9 is one option for achieving this advantageous arrangement.

Figure 10:
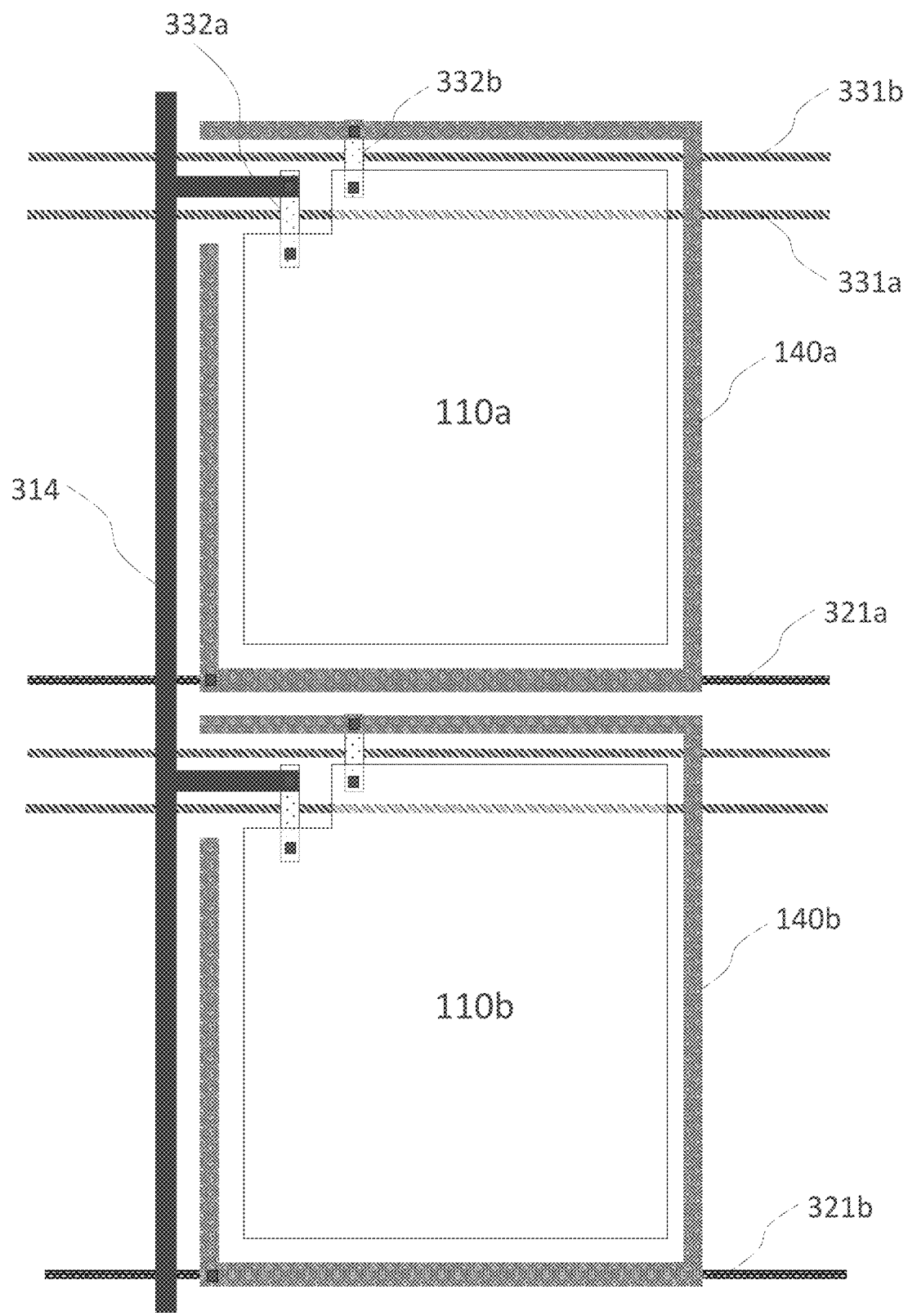
FIG. 10 illustrates another exemplary arrangement for a system having multi-state electrodes.

FIG. 10 illustrates another exemplary arrangement for a system having multi-state electrodes. The embodiment illustrated in FIG. 10 is similar to the embodiments shown in FIGS. 8A-8B and 9, and the corresponding description above likewise applies to FIG. 10. Similar to the embodiments shown in FIGS. 8A-8B and 9, electrodes 110a, 110b (or any number of electrodes, see FIGS. 6-7 for exemplary layouts which may be expanded to include any desired number of electrodes) may be connected to an output line 314 by way of respective switches. In some embodiments, the switches may be controlled by respective gate lines. In some embodiments, electrode 110a, 110b may also be selectively connectable with shields 140a, 140b by respective switches, which may be controlled by respective gate lines. In some embodiments, the shields 140a, 140b may be coplanar to one or both of the electrode 110 and the output line 314.

As illustrated in FIG. 10, shields 140a, 140b may be electrically connected to respective lines 321a, 321b. In some embodiments, the lines 321a, 321b may be drive lines which may selectively supply a driving signal to the respective shields 140a, 140b. In some embodiments, the lines 321a, 321b may selectively apply a ground voltage. In some embodiments, the lines 321a, 321b may be controlled by a gate driver, such as gate driver 330b as illustrated in FIGS. 6 and 7. In some embodiments, the arrangement shown in FIG. 10 may allow driving and/or ground signals to be selectively applied to linear arrays of electrodes. For example, some or all of the electrodes along a row or column of electrodes may be connected to line 321a, such that all of the electrodes in this row or column may be selectively driven or grounded together. In some embodiments, lines 321a, 321b may extend transversely to output lines 314, such that driving and/or ground signals may be selectively applied along line(s) extending transversely to the line(s) of electrodes from which measurement signals are selectively received.

Figure 11A:
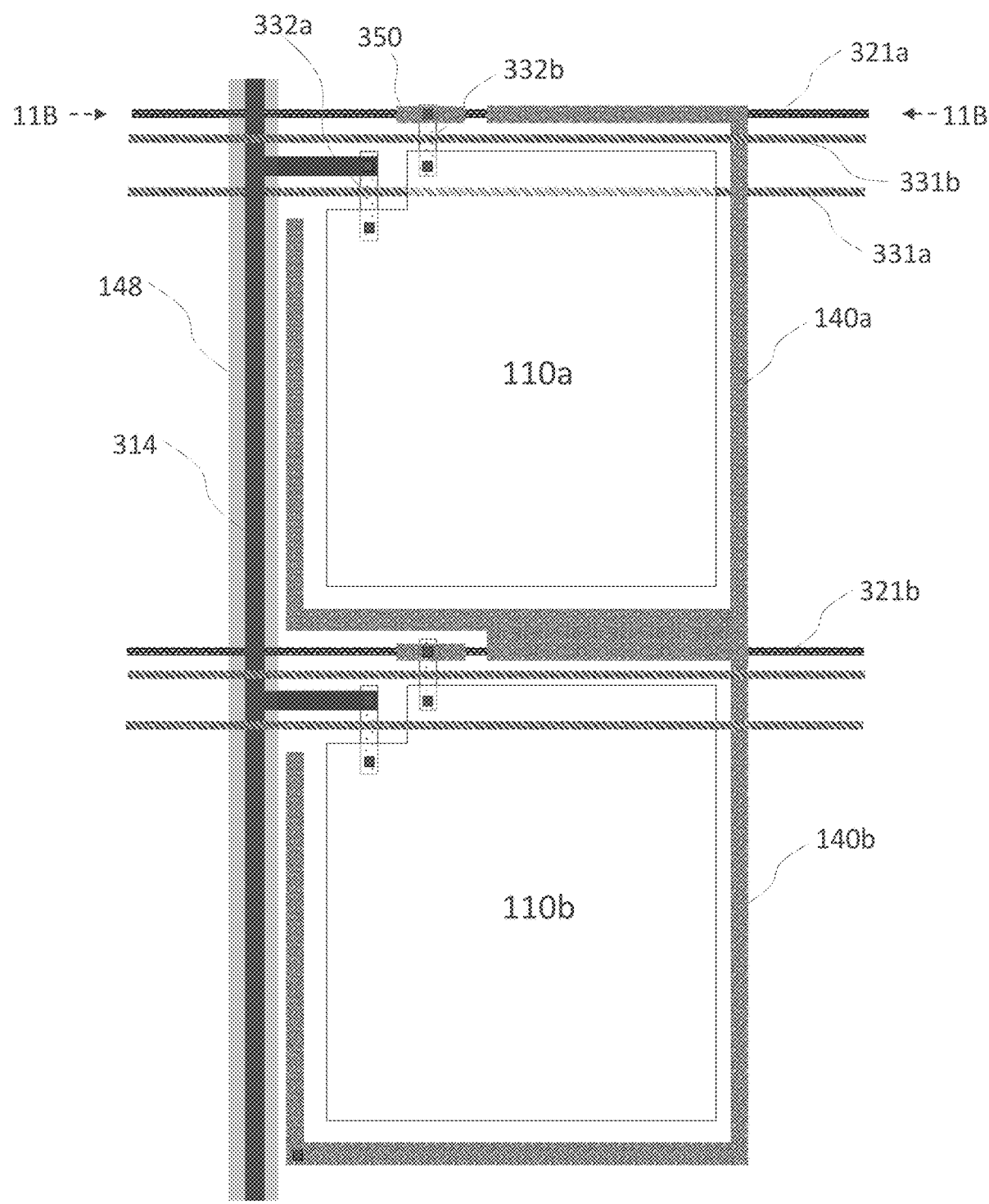
FIGS. 11A-11B illustrate another exemplary arrangement for a system having multi-state electrodes.
Figure 11B:
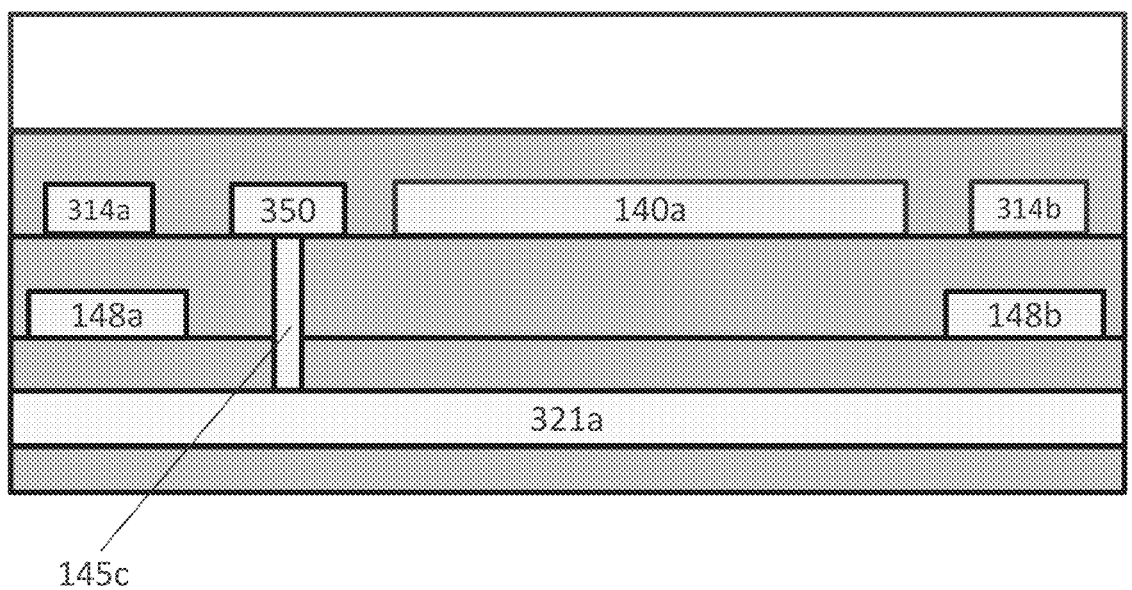

FIGS. 11A-11B illustrate another exemplary arrangement for a system having multi-state electrodes. The embodiment illustrated in FIGS. 11A-11B is similar to the embodiments shown in FIGS. 8A-8B, 9, and 10, and the corresponding description above likewise applies to FIG. 11. Similar to the embodiments shown in FIGS. 8A-8B, 9, and 10, electrodes 110a, 110b may be connected to an output line 314 by way of respective switches. In some embodiments, the switches may be controlled by respective gate lines. In some embodiments, electrode 110a, 110b may also be selectively connectable with shields 140a, 140b by respective switches, which may be controlled by respective gate lines. In some embodiments, the shields 140a, 140b may be coplanar to one or both of the electrode 110 and the output line 314.

Like the embodiment illustrated in FIG. 10, the embodiment of FIG. 11A-11B includes lines 321a, 321b, which may be used to selectively apply a driving signal or ground voltage to electrodes 110a, 110b. Rather than connecting to shields 140a, 140b, however, lines 321a, 321b may connect to segments 350, which may be selectively connected to electrodes 110a, 110b via respective switches 332b. In this manner, a driving signal may be selectively applied to electrodes 110a, 110b without also applying the driving signal to the associated shields. Segments 350 may optionally be coplanar to the electrodes. Alternatively, lines 321a, 321b and associated switches 332b may be provided in one or more layers below the electrodes 110a, 110b. In the latter case, driving signal(s) may be connected to the electrodes by vias, which may directly connect to the electrodes 110a, 110b, or may alternatively connect to one or more intermediate structures such as segments 350. Optionally, shields in a common column and/or row may be electrically connected to one-another, which may facilitate grounding the shields.

In some embodiments, shields in both columns and rows may be electrically connected to one-another, such that some or all of the shields 140 may be grounded together.

As discussed above with respect to FIG. 10, lines 321a, 321b may extend transversely to output lines 314. In some embodiments, as shown in FIGS. 11A and 11B, a shield 148 may be disposed vertically between the output line 314 and lines 321a, 321b.

FIG. 11B shows an exemplary cross-section taken at a position indicated by arrows 11B in FIG. 11A. In some embodiments, a first output line 314a may extend adjacent to a respective segment 350, which may be connected to line 321a by a via 145c. Shield 140a may extend between segment 350 and a second output line 314b, which may be associated with an adjacent cell (or column or row). In some embodiments, a shield 148a may be provided between line 321a and output line 314a. Likewise, a shield 148b may be provided between line 321a and output line 314b. In some embodiments, optional shields 148a, 148b may reduce coupling between a driving signal applied by line 321a and the signals received by output lines 314a, 314b.

Figure 12:
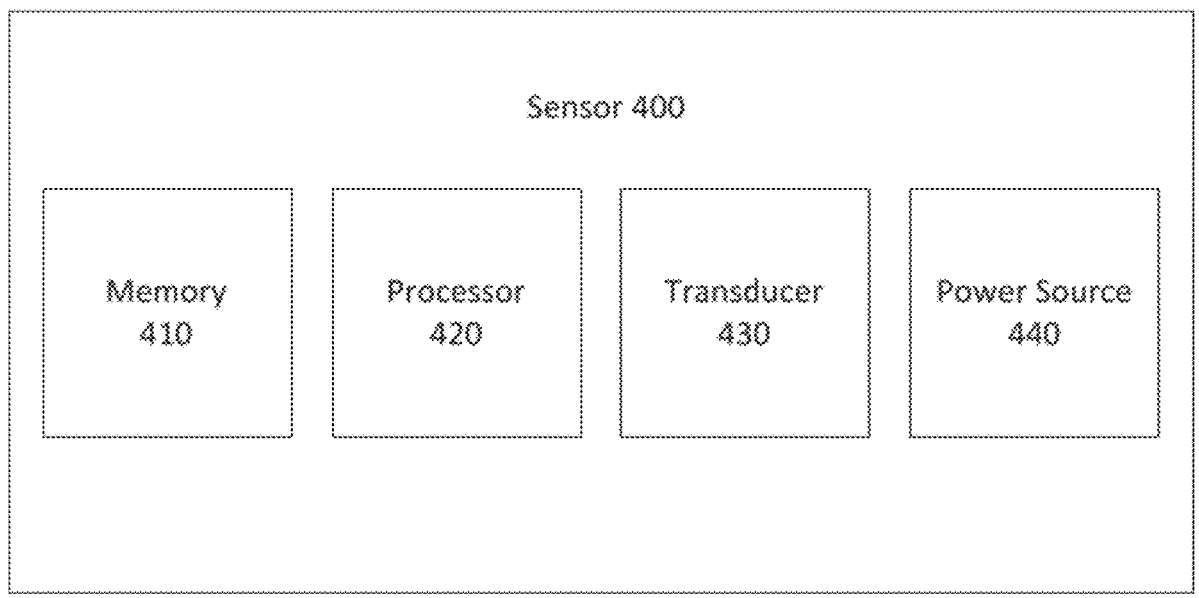
FIG. 12 illustrates a figurative diagram of an exemplary sensor system.

FIG. 12 illustrates a figurative diagram of an exemplary sensor system 400. The sensor system 400 may include a memory 410, a processor 420, a transducer 430, and a power source 440 and circuitry to connect them. In some embodiments, the transducer 430 may be embodied as a two-dimensional grid of electrodes and receiving circuitry as described above. The memory 410 may store instructions for or results of any of the processing steps, calculations, and/or determinations described herein. The processor 420 may be configured to perform any of these processing steps, calculations, and/or determinations. In some embodiments, the power source 440 may be a battery, capacitor, inductor, generator, or other element capable of applying power. Components 410, 420, 430 and 440 need not exist within a single physical device. For example the memory 410 and/or the processor 420 may be distributed among multiple devices and/or they may be connected (e.g., by wired or wireless connections) to other components of the sensor system 400.

Figure 13:
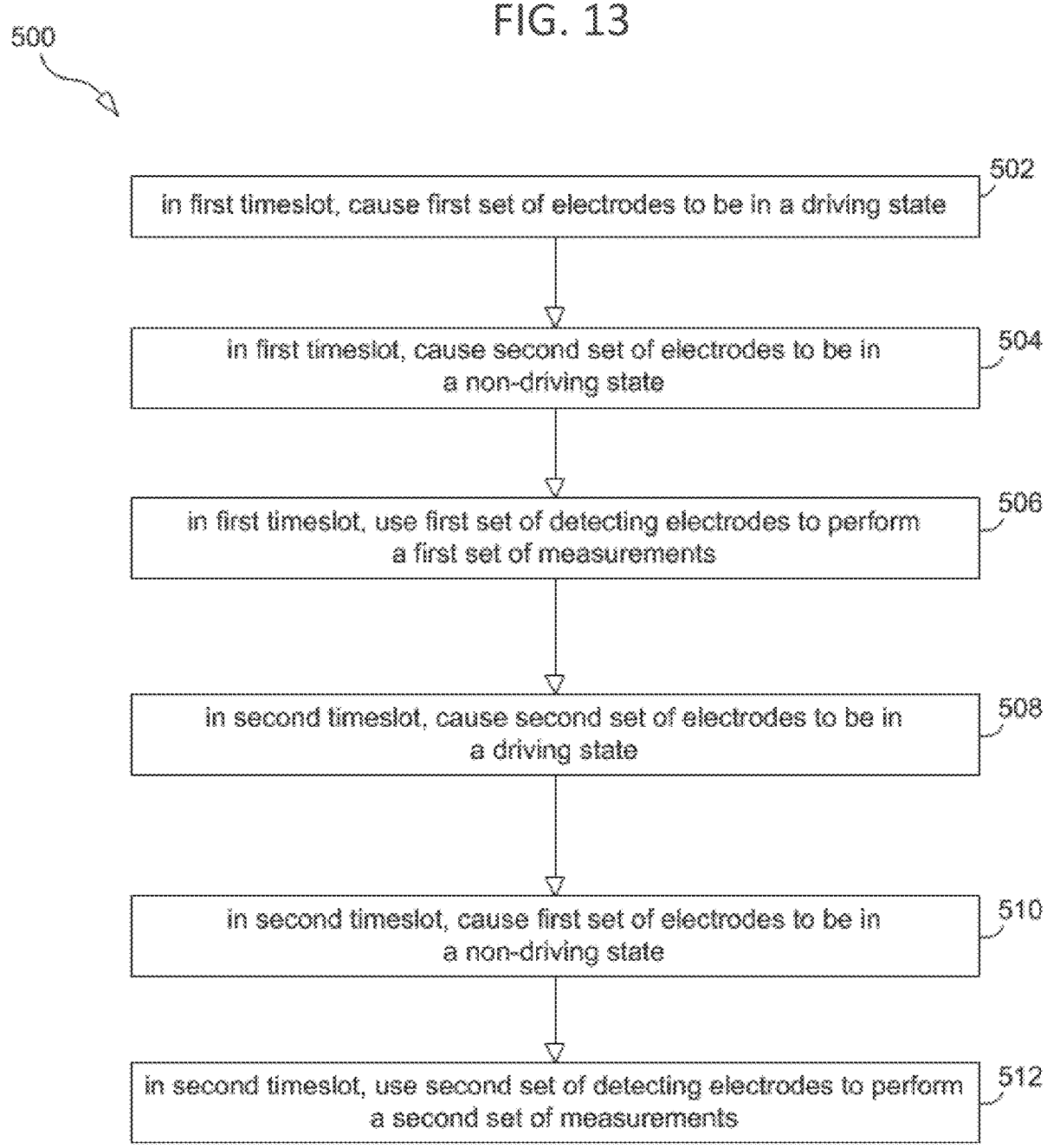
FIG. 13 illustrates an exemplary method 500 for performing measurements using a sensor system with multi-state electrodes.

FIG. 13 illustrates an exemplary method 500 for performing measurements using a sensor system with multi-state electrodes. In some embodiments, the system may include a plurality of electrodes, and each electrode of the plurality of electrodes may have at least a first state in which a driving signal is applied to the respective electrode and a second state in which a driving signal is not applied to the respective electrode. In some embodiments, any of the multi-state electrode arrangements described above may be used. Method 500 may be performed using electrodes having exactly two states, or it may be performed using electrodes having more than two states. For example, multiple driving states may be used (e.g., driven sensing states, and driven non-sensing states). Likewise, multiple non-driving states may be used (e.g., sensing states and grounded states). Unless otherwise specified, references to states should be broadly understood to refer to any appropriate state or states that satisfy the description(s) associated with that respective state.

In some embodiments, steps 502, 504, 506 may be performed in a first timeslot. The first timeslot may include one or more subparts. For example, the first timeslot may be divided into multiple subparts such that a set of electrodes may be in a sensing state according to a CDM pattern within the first timeslot. In step 502, a first set of electrodes may be in a first state such that a driving signal is applied to the first set of electrodes. In some embodiments, applying the driving signal to the first set of electrodes may generate, at least in part, a difference in voltage between the body portion and a first set of detecting electrodes. In step 504, a second set of electrodes may be in a second state such that the second set of electrodes are not driven. In step 506, the first set of detecting electrodes may be placed in a sensing state to collect a first set of measurements, which may indicate whether a body portion or a component thereof is within a detectable range of the first set of detecting electrodes. In some embodiments, the first set of detecting electrodes may be identical to the first set of electrodes such that the first set of electrodes may be used to perform measurements at the same as they are driven. (Exemplary embodiments are described above with respect to FIGS. 2A, 2B and 3). In other embodiments, the first set of detecting electrodes may be identical to the second set of electrodes such that the second set of electrodes may be used to perform measurements while they are not driven. (Exemplary embodiments are described above with respect to FIG. 4).

In some embodiments, steps 508, 510, 512 may be performed in a second timeslot. The second timeslot (and any subsequent timeslots) may also include one or more subparts. For example, the second timeslot may be divided into multiple subparts such that a set of electrodes may be placed in sensing states according to a CDM pattern within the second timeslot. In step 508, the second set of electrodes may be in the first state such that the driving signal is applied to the second set of electrodes. In some embodiments, applying the driving signal to the second set of electrodes may generate, at least in part, a difference in voltage between the body portion and the second set of detecting electrodes. In step 510, the first set of electrodes may be in the second state such that the first set of electrodes are not driven. In step 512, the second set of detecting electrodes may be placed in a sensing state to collect a second set of measurements, which may indicate whether a body portion or a component thereof is within a detectable range of the second set of detecting electrodes. In some embodiments, the second set of detecting electrodes may be identical to the second set of electrodes such that the second set of electrodes are used to perform a measurement at the same as they are driven. (One such example is described above with respect to FIGS. 2A, 2B and 3). In other embodiments, the second set of detecting electrodes may be identical to the first set of electrodes such that the first set of electrodes are used to perform a measurement while they are not driven. (One such example is described above with respect to FIG. 4). As will be apparent from the foregoing description, method 500 may be repeated as many times as needed to collect measurements from all desired electrodes of a sensor system.

In some embodiments, a driving signal may be applied to a third set of electrodes during the first timeslot. For example, driving signals may be applied to a guard lines of electrodes, as illustrated in FIGS. 2A, 2B and 3. In some embodiments, including but not limited to that illustrated in FIG. 3, at least one electrode of the first set of electrodes may be connected to a first terminal of an analog front end, and at least one electrode of the third set of electrodes may be connected to a second terminal of the analog front end. For example, an electrode of the first set may be connected to the first terminal of the AFE such that it is in a driven sensing state, and an electrode of the third set may be connected to the second terminal of the AFE such that it is in a driven non-sensing state.

In some embodiments, a third set of electrodes, which may be adjacent to the first set of electrodes, may be in a grounded state in the first timeslot. In some embodiments, the grounded third set of electrodes may be adjacent to the first set of detecting electrodes. In some embodiments, the grounded electrodes may act as a guard line during the first timeslot. In some embodiments, the third set of electrodes in the grounded state may be electrically connected to a shield that is coplanar with the plurality of electrodes.

In some embodiments, the first set of electrodes may be adjacent to the second set of electrodes. In some embodiments, during the first timeslot, the first set of electrodes may be driven, and the second set of electrodes may be in a non-driven sensing state, such that a mutual capacitance is formed between the electrodes of the first set and the electrodes of the second set. In some embodiments, the first set of measurements received by the second set of electrodes during the first timeslot may indicate that the body portion modified a mutual capacitance between an electrode of the first set of electrodes and an electrode of the second set of electrodes.

In some embodiments, the first and/or second timeslots may include multiple subparts. In some embodiments, the multiple subparts may be used to collect measurements from electrodes using CDM patterns, as described above. In some embodiments, the second state, which may be a sensing state, may include multiple sub-states. For example, the second state may include a first detecting state (e.g., a positive sensing state) in which a respective electrode of the plurality of electrodes is connected to a first terminal of an AFE. The second state may also include a second detecting state (e.g., a negative sensing state) wherein the respective electrode is connected to a second terminal of an AFE. In some embodiments, a first electrode of the second set of electrodes may be in the first detecting state during a first subpart of the first timeslot. In some embodiments, a second electrode of the second set of electrodes may be in the second detecting state during the first subpart of the first timeslot. In embodiments where the AFE determines a difference between the signals received from the first and second terminals, the AFE may thereby determine, at least in part, a difference in the signals received from the first and second electrodes during the first subpart of the first timeslot. In subsequent subparts of the timeslots, measurements may be collected from the electrodes of the second set (including, e.g., the first and second electrodes) using the first and second detecting states. In some embodiments, the selection of detecting states in the respective subparts of the timeslots may determined according to a CDM pattern.

Figure 14:
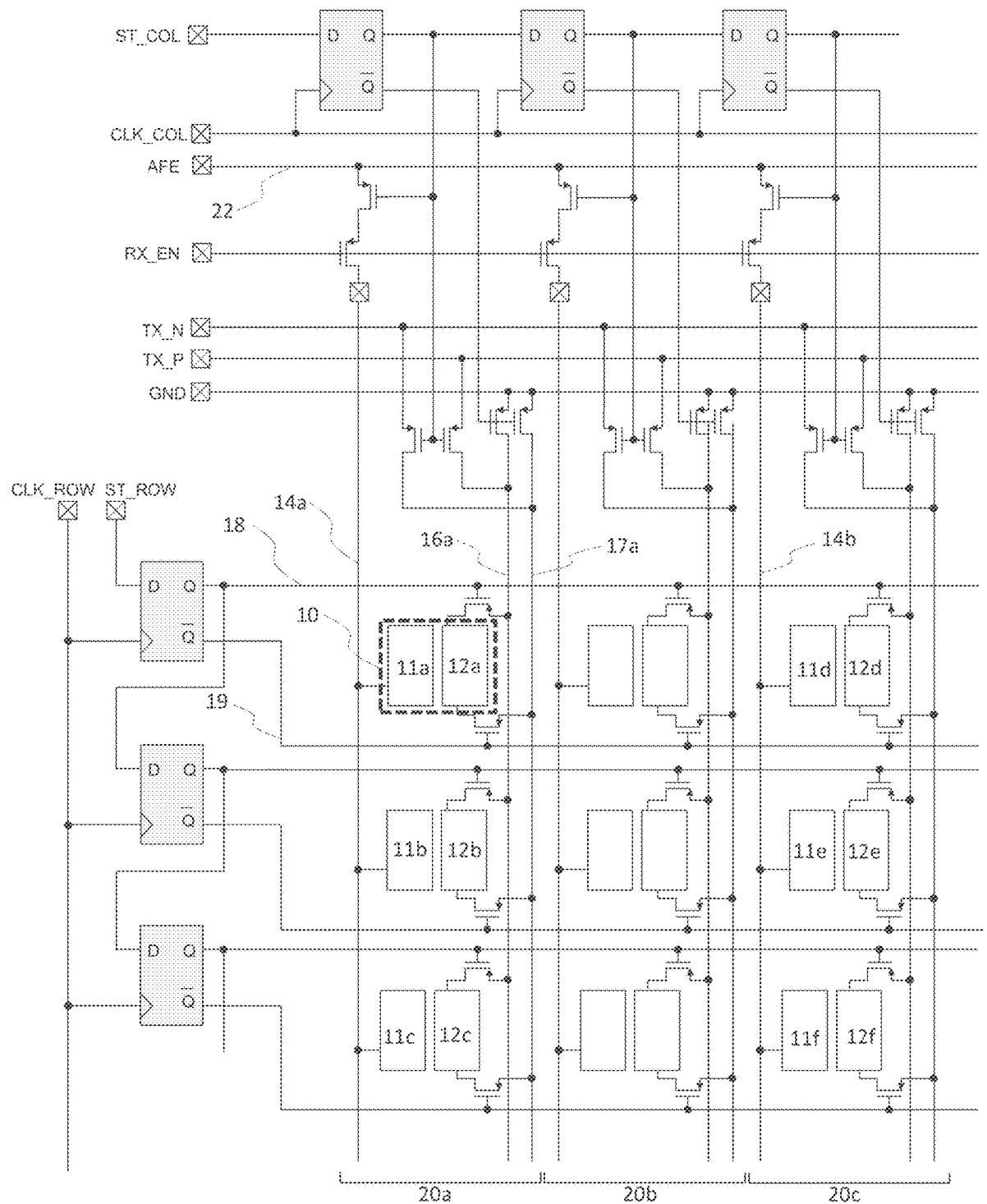
FIG. 14 illustrates another exemplary embodiment for a sensor.

FIG. 14 illustrates another exemplary embodiment for a sensor. In this embodiment, a sensor may include a plurality of cells 10, each of which may be configured to be used to perform a presence measurement. In some embodiments, each cell 10 may include a transmit electrode (e.g., 12a-f) and a receive electrode (e.g., 11a-f). In some embodiments, the cells 10 may be arranged in linear arrays 20a, 20b, 20c. For example, a first linear array 20a may include cell 11a, 12a, cell 11b, 12b, and cell 11ac, 12c. A second linear array 20b may likewise include its own cells (shown in FIG. 14), a third linear array 20c may include cell 11d, 12d, cell 11e, 12e, and cell 11f, 12f. Each of the transmit electrodes (e.g., 12a-12c) in a respective linear array (e.g., 20a) may be selectively connected to associated drive lines (e.g., 16a, 17a) for that linear array (e.g., 20a). Likewise, each of the receive electrodes (e.g., 11a-11c) in a respective linear array (e.g., 20a) may be connected to an associated output line (e.g., 14a) for that linear array (e.g., 20a). This arrangement may be applied across a sensor area for as many linear arrays as are desired for a given application. Likewise, each linear array in a sensor area may include as many cells as are desired for a given application.

In some embodiments, a transmit electrode 12a may be configured to apply one or more driving signals, such that a capacitive signal received by a receive electrode 11a in the same cell 10 may be modulated if an object to be sensed is within a detectable range. FIG. 14 shows an exemplary embodiment in which each transmit electrode 12a-12f is configured to selectively apply two driving signals (one at a time). For example, transmit electrode 12a may have a first state in which it is selectively connected to drive line 16a, which in turn may be selectively connected to a first central drive line on which a first driving signal TX_P may be applied. Transmit electrode 12a may have a second state in which it is selectively connected to drive line 17a, which in turn may be selectively connected to a second central drive line on which a second driving signal TX_N may be applied. In some embodiments, the first and second driving signals may be inverted relative to one another. In some embodiments, the first and second driving signals may sum to substantially zero. As shown in FIG. 14, each of the transmit electrodes 12a-12f in the sensor system may likewise have first and second states, which may be selectively applied by connecting the respective transmit electrode to one of two or more respective drive lines, through which first and second driving signals may be applied.

In some embodiments, a selection between the first and second states may be effected via gate lines (e.g., 18, 19). For example, when gate line 18 is active, transmit electrode 12a may be connected to drive line 16a, such that transmit electrode 12a is in the first state. Conversely, when gate line 19 is active, transmit electrode 12a may be connected to drive line 17a, such that transmit electrode 12a is in the second state. In some embodiments, each electrode in a row (e.g., a group of electrodes extending in a direction transversely to a linear arrays 20a, 20b, 20c) may be controlled via common gate lines. For example, transmit electrode 12a and transmit electrode 12d may both be controlled by gate lines 18, 19. In this manner, during a timeslot in which transmit electrode 12d is in the first state, transmit electrode 12d may also be in the first state (assuming that arrays 20a and 20c are active in the same timeslot). The same principle may extend to each of the rows of the system.

In some embodiments, drive lines 16a, 17a may also be selectively connected to a central ground line GND, which may cause drive lines 16a, 17a to be grounded. In some embodiments, drive lines may be selectively connected to either driving signals TX_P, TX_N or to ground GND. In some embodiments, this selection may be performed on an array-by-array basis. For example, in a given timeslot, the drive lines for array 20a may be driven, the drive lines for array 20b may be grounded, and the drive lines for array 20c may be driven. Any desired permutation of driven and grounded arrays may be used. In some embodiments, it may be preferable to avoid having adjacent arrays driven simultaneously, in order to reduce parasitic capacitance between the arrays. For example, array 20a may be driven (and measurements obtain from the cells of array 20a) while adjacent array 20b (arrays 20a and 20b are considered to be adjacent arrays because there are no other arrays between arrays 20a and 20b) is grounded. In a subsequent timeslot, array 20a may be grounded while adjacent array 20b is driven.

In some embodiments, the arrays may be configured such that the output lines (e.g., 14a, 14b) may be selectively connected to a central receive line 22, which may be connected to an AFE. In some embodiments, an array's receive line may be connected to an AFE while that array's drive lines are driven. Conversely, when the array's drive lines are grounded, that array's receive line may be disconnected to the AFE. For example, selection circuitry may be used to activate the cells of array 20a in a given timeslot (or group of timeslots). While array 20a is active, drive lines 16a, 17a may be connected to respective central driving lines to apply first and second driving signals TX_P, TX_N. At the same time, output line 14a may be connected to central receive line 22, such that measurements received by the cells of array 20a may be transmitted to an AFE. Conversely, while array 20a is inactive, drive lines 16a, 17a may be connected to a ground line GND, and output line 14a may be disconnected from central receive line 22. This same operative configuration may be extended to each of the arrays in a sensor. In this manner, selection circuitry may be used to select which arrays are active and inactive in a given timeslot, so that the signals received by the AFE in each timeslot may be correlated with a correct array and cell. Likewise, by controlling which arrays are grounded, parasitic capacitance may be reduced (e.g., by interleaving active and inactive arrays).

In some embodiments, an AFE may receive measurement signals from some or all of the cells 10 in an array (e.g., 20a) simultaneously. In some embodiments, a CDM pattern may be applied to the cells 10 of an array (e.g., 20a) such that the measurement signals received by the AFE may be correlated with a correct cell in that array. As one example, a Legendre code may be modified to have two states (e.g., a +1 and a −1 state), and that code may be applied to the transmit electrodes (e.g., 12a, 12b, 12c) of an array by driving the transmit electrodes using the first driving signal and the second driving signal according to the states indicated by the code. Other suitable multiplexing may also be used. In embodiments where cells have only two states, CDM patterns with only two states may be used. In some embodiments, cells may be provided with a third state (e.g., a ground state). For example, transmit electrodes may optionally be configured to connect to a third drive line (or shield) that is always grounded. In such embodiments, CDM patterns with three states (e.g., +1, 0, −1) may be used.

For example, in a first timeslot, the first driving signal may be applied to transmit electrode 12a, and a measurement signal may be received using receive electrode 11a. At the same time, the second driving signal may be applied to transmit electrode 12b, and a measurement signal may be received using receive electrode 11b. In a second timeslot, the second driving signal may be applied to transmit electrode 12a, and a measurement signal may be received using receive electrode 11a. At the same time, the first driving signal may be applied to transmit electrode 12b, and a measurement signal may be received using electrode 11b. The driving signals applied over a plurality of timeslots in a given array (e.g., 20a) may thus be selected according to a multiplexing pattern, such that a plurality of measurement signals received by an output line (e.g., 14a) may be decoded and the received measurement signals correlated to the correct cells. In some embodiments, the system may then select another linear array, and repeat this process to obtain measurements from the cells of that linear array. In some embodiments, the process may be repeated for each linear array until at least one measurement has been obtained from each cell in a sensing area of the system.

In some embodiments, measurements may be collected from the cells of multiple arrays simultaneously. For example, in the exemplary embodiment of FIG. 14, measurements may be collected from arrays 20a and 20c simultaneously. This may be accomplished, for example, by connecting the drive lines of the arrays 20a and 20c to apply the first and second driving signals TX_P and TX_N. The output lines 14a, 14b may also be connected to the common receive line 22, and the AFE may thus receive measurement signals from the cells of the multiple arrays 20a, 20c simultaneously. While two arrays 20a, 20c are discussed in this embodiment, measurements may be simultaneously collected from any number of arrays.

In some embodiments, a sensor area may include a plurality of arrays that are arranged in logical groups, each logical group including two or more arrays. Measurements from each array within a given group may be collected simultaneously over a plurality of timeslots, and the system may then iteratively switch to the next group(s) in sequence to collect measurements from the arrays of each group. For example, in an embodiment with two groups, a first group may include half of the arrays of a sensor area, and a second group may include the other half of the arrays of the sensor area. Optionally, the arrays of the first group may be interleaved with the arrays of the second group, such that adjacent arrays are not driven simultaneously. Three, four, five, or more groups may be used in some embodiments.

In some embodiments, the signals received from simultaneously active arrays may be encoded according to a CDM pattern, such that the received signals may be decoded to correlate the measurement signals received to the array from which they were received. For example, the measurement signals received by a given output line may be passed to the AFE in an unmodified (+1) or inverted (−1) form, in accordance with a CDM pattern. In some embodiments, this modulation may be implemented using an encoding circuit RX_EN, Additional states (e.g., grounded) may be implemented as desired to accommodate CDM patterns with three or more states.

In some embodiments, signals received by cells 10 may thus be encoded twice. The signals received by the cells 10 of an array 20a may be encoded a first time, such that these signals may be decoded to determine from which cell 10 in the array 20a a given signal (or set of signals) was received. The signals received by the array 20a, along with any other arrays in the same logical group, may be encoded a second time, such that these signals may be decoded to determine from which array a given signal (or set of signals) was received. In such embodiments, the system may therefore perform a first decoding step to a collection of signals received over a given set of timeslots, thereby correlating received signals to the correct respective array. The system may then perform a second decoding step on the signals received from each array, thereby correlating the signals received from that array to the correct cell within that array.

FIG. 15 illustrates an exemplary method 600 for detecting a portion of a user's body or other element. In some embodiments, the method 600 may be performed using a system such as that described above with respect to FIG. 14. For example, method 600 may be performed in a system having a plurality of cells which may include at least a first cell and a second cell. In some embodiments, each cell of the plurality of cells may include a respective transmit electrode, which may be configured to selectively apply a first driving signal, and which may also be configured to selectively apply a second driving signal that is inverted relative to the first driving signal. In some embodiments, each cell of the plurality of cells may further include a respective receive electrode. In step 602, a first driving signal may be applied to the first transmit electrode of the first cell during a first timeslot. In step 604, also during the first timeslot, a first measurement signal may be received using the receive electrode of the first cell. In step 606, during a second timeslot, a second driving signal may be applied to the transmit electrode of the first cell. In step 608, also during the second timeslot, a second measurement signal may be received using the receive electrode of the first cell.

NUMBERED EMBODIMENTS

A1. A method for detecting a portion of a user's body, the method being performed by a system comprising a plurality of cells, each cell of the plurality of cells comprising a transmit electrode and a receive electrode, the plurality of cells comprising a first cell, wherein the method comprises:
in a first timeslot:
applying a first driving signal to the transmit electrode of the first cell; and
receiving a first measurement signal using the receive electrode of the first cell; and
in a second timeslot:
applying a second driving signal to the transmit electrode of the first cell; and
receiving a second measurement signal using the receive electrode of the first cell;
wherein the second driving signal is inverted relative to the first driving signal.

A2. The method of embodiment A1, wherein the plurality of cells comprises a first set of cells, the first set of cells comprising at least the first cell and a second cell, each receive electrode of the first set of cells being electrically connected to a first output line, the method further comprising:
in the first timeslot:
applying the second driving signal to the transmit electrode of the second cell while the first driving signal is applied to the transmit electrode of the first cell; and
receiving the first measurement signal using the first output line, the first output line being electrically connected to the receive electrodes of both the first cell and the second cell;
in the second timeslot:
applying the first driving signal to the transmit electrode of the second cell while the second driving signal is applied to the transmit electrode of the first cell; and
receiving the second measurement signal using the first output line, the first output line being electrically connected to the receive electrodes of both the first cell and the second cell.

A3. The method of embodiment A2, wherein the plurality of cells comprises a second set of cells, wherein no driving signal is applied to the second set of cells during the first timeslot or the second timeslot.

A4. The method of embodiment A3, wherein the first set of cells is arranged in a first linear array, the second set of cells is arranged in a second linear array, and the first linear array is adjacent to the second linear array such that each cell of the first set is adjacent to a respective cell of the second set.

A5. The method of any of embodiments A2-A4, wherein each cell of the first set of cells has a first state and a second state, wherein:
in the first state, the transmit electrode of the respective cell is selectively connected to a first drive line that is configured to apply the first driving signal; and in the second state, the transmit electrode of the respective cell is selectively connected to a second drive line that is configured to apply the second driving signal.

A6. The method of embodiment A5, wherein the method comprises:
applying the first and second states to the first set of cells over a plurality of timeslots according to a multiplexing pattern;
receiving a plurality of measurement signals using the first output line, wherein a respective measurement signal is received in each timeslot of the plurality of timeslots; and
processing the plurality of measurement signals to obtain a respective measurement for each cell of the first set of cells.

A7. The method of embodiment A6, wherein the plurality of cells comprises a second set of cells, each receive electrode of the second set being connected to a second output line, each cell of the second set of cells having a first state and a second state, wherein:
in the first state, the transmit electrode of the respective cell of the second set is selectively connected to a first drive line of the second set that is configured to apply the first driving signal; and
in the second state, the transmit electrode of the respective cell of the second set is selectively connected to a second drive line of the second set that is configured to apply the second driving signal;
the method further comprising:
applying the first and second states to the second set of cells over the plurality of timeslots according to a multiplexing pattern, the application of the first and second states to the second set of cells occurring simultaneously with the application of the first and second states to the first set of cells;
receiving a plurality of measurement signals using the second output line, wherein a respective measurement signal is received using the second output line in each timeslot of the plurality of timeslots; and
processing the plurality of measurement signals received using the second output line to obtain a respective measurement for each cell of the second set of cells.

A8. The method of embodiment A7, wherein the first output line and the second output line are connected to a common analog front end during the plurality of timeslots.

A9. The method of embodiment A8, further comprising:
encoding the measurement signals received using the first output line and the measurement signals received using the second output line during the first plurality of timeslots, such that the encoded measurement signals are configured be combined and decoded to separate the measurement signals received using the first output line from the measurements received using the second output line.

A10. The method of any of embodiments A2-A9, the method further comprising:
obtaining measurements from at least the cells of the first set of cells in a first set of timeslots; and
obtaining measurements from one or more additional sets of cells of the plurality of cells in one or more subsequent sets of timeslots until at least one measurement has been obtained from each cell of the plurality of cells.

A11. A system for detecting a portion of a user's body, the system comprising:
a plurality of cells comprising at least a first cell and a second cell, wherein: each cell of the plurality of cells comprises a respective transmit electrode, the respective transmit electrode being configured to selectively apply a first driving signal, the respective transmit electrode being further configured to selectively apply a second driving signal that is inverted relative to the first driving signal;
each cell of the plurality of cells further comprises a respective receive electrode; and the system is configured to:

apply, in a first timeslot, the first driving signal to the transmit electrode of the first cell; and
receive, in the first timeslot, a first measurement signal using the receive electrode of the first cell; and
apply, in a second timeslot, the second driving signal to the transmit electrode of the first cell; and
receive, in the second timeslot, a second measurement signal using the receive electrode of the first cell.

A12. The system of embodiment A11, wherein:
the plurality of cells comprises a first set of cells, the first set of cells comprising at least the first cell and a second cell;
each receive electrode of the first set of cells is electrically connected to a first output line; and
the system is further configured to:
apply, in the first timeslot, the second driving signal to the transmit electrode of the second cell while the first driving signal is applied to the transmit electrode of the first cell; and
receive, in the first timeslot, the first measurement signal using the first output line, the first output line being electrically connected to the receive electrodes of both the first cell and the second cell;
apply, in the second timeslot, the first driving signal to the transmit electrode of the second cell while the second driving signal is applied to the transmit electrode of the first cell; and
receive, in the second timeslot, the second measurement signal using the first output line, the first output line being electrically connected to the receive electrodes of both the first cell and the second cell.

A13. The system of embodiment A12, wherein the plurality of cells comprises a second set of cells, the system being configured to apply no driving signal to the second set of cells during the first timeslot or the second timeslot.

A14. The system of embodiment A13, wherein the first set of cells is arranged in a first linear array, the second set of cells is arranged in a second linear array, and the first linear array is adjacent to the second linear array such that each cell of the first set is adjacent to a respective cell of the second set.

A15. The system of any of embodiments A12-A14, wherein each cell of the first set of cells has a first state and a second state, such that:
in the first state, the transmit electrode of the respective cell is selectively connected to a first drive line that is configured to apply the first driving signal; and in the second state, the transmit electrode of the respective cell is selectively connected to a second drive line that is configured to apply the second driving signal.

A16. The system of embodiment A15, wherein the system is configured to:
apply the first and second states to the first set of cells over a plurality of timeslots according to a multiplexing pattern;
receive a plurality of measurement signals using the first output line, wherein a respective measurement signal is received in each timeslot of the plurality of timeslots; and
process the plurality of measurement signals to obtain a respective measurement for each cell of the first set of cells.

A17. The system of embodiment A16, wherein:
the plurality of cells comprises a second set of cells;
each receive electrode of the second set is connected to a second output line;
each cell of the second set of cells has a first state and a second state, such that:
in the first state, the transmit electrode of the respective cell of the second set is selectively connected to a first drive line of the second set that is configured to apply the first driving signal; and
in the second state, the transmit electrode of the respective cell of the second set is selectively connected to a second drive line of the second set that is configured to apply the second driving signal; and
the system is configured to:
apply the first and second states to the second set of cells over the plurality of timeslots according to a multiplexing pattern, the application of the first and second states to the second set of cells occurring simultaneously with the application of the first and second states to the first set of cells;
receive a plurality of measurement signals using the second output line, wherein a respective measurement signal is received using the second output line in each timeslot of the plurality of timeslots; and
process the plurality of measurement signals received using the second output line to obtain a respective measurement for each cell of the second set of cells.

A18. The system of embodiment A17, wherein the first output line and the second output line are connected to a common analog front end during the plurality of timeslots.

A19. The system of embodiment A18, wherein the system is further configured to:
encode the measurement signals received using the first output line and the measurement signals received using the second output line during the first plurality of timeslots, such that the encoded measurement signals are configured be combined and decoded to separate the measurement signals received using the first output line from the measurements received using the second output line.

A20. The system of embodiment any of embodiments A12-A19, wherein the system is further configured to:
obtain measurements from at least the cells of the first set of cells in a first set of timeslots; and
obtain measurements from one or more additional sets of cells of the plurality of cells in one or more subsequent sets of timeslots until at least one measurement has been obtained from each cell of the plurality of cells.

B1. A method for detecting a portion of a user's body, the method being performed by a system comprising a plurality of electrodes, each electrode of the plurality of electrodes having at least a first state in which a driving signal is applied to the respective electrode and a second state in which said driving signal is not applied to the respective electrode, the plurality of electrodes comprising a first set of electrodes and a second set of electrodes, the method comprising:
in a first timeslot:
causing the first set of electrodes to be in the first state such that the driving signal is applied to the first set of electrodes, the application of the driving signal to the first set of electrodes generating, at least in part, a difference in voltage between the body portion and a first set of detecting electrodes, the first set of detecting electrodes being comprised within the plurality of electrodes;
causing the second set of electrodes to be in the second state; and
using the first set of detecting electrodes, performing a first set of measurements, the first set of measurements indicating whether the body portion or a component thereof is within a detectable range of the first set of detecting electrodes, wherein the first set of detecting electrodes is identical to either the first set of electrodes or the second set of electrodes; and in a second timeslot:
causing the second set of electrodes to be in the first state such that the driving signal is applied to the second set of electrodes, the application of the driving signal to the first second of electrodes generating, at least in part, a difference in voltage between the body portion and a second set of detecting electrodes, the second set of detecting electrodes being comprised within the plurality of electrodes;

causing the first set of electrodes to be in the second state; and using the second set of detecting electrodes, performing a second set of measurements, the second set of measurements indicating whether the body portion or the component thereof is within a detectable range of the second set of detecting electrodes.

B2. The method of embodiment B1, wherein the first set of electrodes is identical to the first set of detecting electrodes, and the second set of electrodes is identical to the second set of detecting electrodes.

B3. The method of embodiment B2, further comprising:
in the first timeslot, causing the driving signal to be applied to a third set of electrodes, the third set of electrodes being adjacent to the first set of electrodes.

B4. The method of embodiment B3, wherein, during the first timeslot, at least one electrode of the first set of electrodes is connected to a first terminal of an analog front end, and at least one electrode of the third set of electrodes is connected to a second terminal of the analog front end.

B5. The method of embodiment B1, wherein the first set of electrodes is identical to the second set of detecting electrodes, and the second set of electrodes is identical to the first set of detecting electrodes.

B6. The method of embodiment B5, further comprising:
in the first timeslot, causing a third set of electrodes to be in a grounded state.

B7. The method of embodiment B6, wherein the third set of electrodes in the grounded state are, during the first timeslot, electrically connected to a shield that is coplanar with the plurality of electrodes.

B8. The method of embodiment B5, wherein the first set of electrodes is adjacent to the second set of electrodes, and the first set of measurements comprises a first measurement indicating that the body portion or component thereof modified a mutual capacitance between an electrode of the first set of electrodes and an electrode of the second set of electrodes.

B9. The method of embodiment B5, wherein the first timeslot includes at least a first subpart, and the second state includes at least a first detecting state wherein a respective electrode of the plurality of electrodes is connected to a first terminal of an analog front end and a second detecting state wherein the respective electrode is connected to a second terminal of the analog front end, the method further comprising:
in the first subpart of the first timeslot:
causing a first electrode of the second set of electrodes to be in the first detecting state;
causing a second electrode of the second set of electrodes to be in the second detecting state; and
performing a first measurement of the first set of measurements, the first measurement indicating, at least in part, a difference between a first signal received from the first electrode and a second signal received from the second electrode.

B10. A system for detecting a portion of a user's body, the system comprising:
a plurality of electrodes;
each electrode of the plurality of electrodes having at least a first state in which a driving signal is applied to the respective electrode and a second state in which said driving signal is not applied to the respective electrode;
the plurality of electrodes comprising a first set of electrodes and a second set of electrodes;
wherein the system is configured to:
in a first timeslot:
cause the first set of electrodes to be in the first state such that the driving signal is applied to the first set of electrodes, the application of the driving signal to the first set of electrodes generating, at least in part, a difference in voltage between the body portion and a first set of detecting electrodes, the first set of detecting electrodes being comprised within the plurality of electrodes;
cause the second set of electrodes to be in the second state; and
using the first set of detecting electrodes, perform a first set of measurements, the first set of measurements indicating whether the body portion or a component thereof is within a detectable range of the first set of detecting electrodes, wherein the first set of detecting electrodes is identical to either the first set of electrodes or the second set of electrodes; and in a second timeslot:
cause the second set of electrodes to be in the first state such that the driving signal is applied to the second set of electrodes, the application of the driving signal to the first second of electrodes generating, at least in part, a difference in voltage between the body portion and a second set of detecting electrodes, the second set of detecting electrodes being comprised within the plurality of electrodes;
cause the first set of electrodes to be in the second state; and
using the second set of detecting electrodes, perform a second set of measurements, the second set of measurements indicating whether the body portion or the component thereof is within a detectable range of the second set of detecting electrodes.

B11. The system of embodiment B10, wherein the first set of electrodes is identical to the first set of detecting electrodes, and the second set of electrodes is identical to the second set of detecting electrodes.

B12. The system of embodiment B11, wherein the system is further configured to:
cause, in the first timeslot, the driving signal to be applied to a third set of electrodes, the third set of electrodes being adjacent to the first set of electrodes.

B13. The system of embodiment B12, wherein, during the first timeslot, at least one electrode of the first set of electrodes is connected to a first terminal of an analog front end, and at least one electrode of the third set of electrodes is connected to a second terminal of the analog front end.

B14. The system of embodiment B10, wherein the first set of electrodes is identical to the second set of detecting electrodes, and the second set of electrodes is identical to the first set of detecting electrodes.

B15. The system of embodiment B14, wherein the system is further configured to cause, in the first timeslot, a third set of electrodes to be in a grounded state.

B16. The system of embodiment B15, wherein the third set of electrodes in the grounded state are, during the first timeslot, electrically connected to a shield that is coplanar with the plurality of electrodes.

B17. The system of embodiment B14, wherein the first set of electrodes is adjacent to the second set of electrodes, and the first set of measurements comprises a first measurement indicating that the body portion or component thereof modified a mutual capacitance between an electrode of the first set of electrodes and an electrode of the second set of electrodes.

B18. The system of embodiment B14, wherein the first timeslot includes at least a first subpart, and the second state includes at least a first detecting state wherein a respective electrode of the plurality of electrodes is connected to a first terminal of an analog front end and a second detecting state wherein the respective electrode is connected to a second terminal of the analog front end; and the system is further configured to, in the first subpart of the first timeslot:
cause a first electrode of the second set of electrodes to be in the first detecting state;
cause a second electrode of the second set of electrodes to be in the second detecting state; and
perform a first measurement of the first set of measurements, the first measurement indicating, at least in part, a difference between a first signal received from the first electrode and a second signal received from the second electrode.

B19. A system for detecting a portion of a user's body, the system comprising:
a plurality of electrodes, each electrode of the plurality of electrodes having at least one driving state in which a driving signal is applied to the respective electrode and at least one non-driving state in which said driving signal is not applied to the respective electrode;
a first set of electrodes within the plurality of electrodes, the first set of electrodes being configured to receive the driving signal in the driving state such that the first set of electrodes generates, at least in part, a difference in voltage between the body portion and at least one electrode of the plurality of electrodes;
using the at least one electrode, performing a measurement, the measurement indicating whether the body portion or a component thereof is within a detectable range of the at least one electrode.

B20. The system of embodiment 19, wherein the at least one electrode is configured to be selectively controlled between the driving state, a first detecting state wherein a respective electrode of the plurality of electrodes is connected to a first terminal of an analog front end and a second detecting state wherein the respective electrode is connected to a second terminal of an analog front end.

C1. A system for detecting a portion of a user's body, the system comprising:
a plurality of electrodes, the plurality of electrodes being configured to obtain signals indicative of a presence of the portion of the user's body, the plurality of electrodes comprising at least a first set of electrodes;
a plurality of output lines, the plurality of output lines comprising a first output line, the first output line configured to receive signals from at least a first electrode of the first set of electrodes;
one or more shields, the one or more shields being configured to shield one or more of the output lines of the plurality of output lines from one or more electrodes of the plurality of electrodes;
wherein the one or more shields are coplanar to the plurality of electrodes and the first output line.

C2. The system of embodiment C1, wherein the plurality of electrodes and the one or more shields are formed by a process comprising:
depositing a layer of metal; and
removing some of the layer of metal, such that a remaining portion of the layer of metal comprises the plurality of electrodes and the one or more shields.

C3. The system of embodiment C1, wherein a shield of the one or more shields is configured to be selectively electrically connected to the first electrode of the first set of electrodes.

C4. The system of embodiment C3, wherein the shield of the one or more shields is configured to be grounded.

C5. The system of embodiment C3, wherein the shield of the one or more shields is configured to receive a driving signal.

C6. The system of embodiment C3, wherein the first set of electrodes comprises a first electrode and a second electrode, and the one or more shields comprises a first shield and a second shield, the first shield being adjacent to and at least partially electrically isolating the first electrode, the second shield being adjacent to and at least partially electrically isolating the second electrode;
wherein the first shield is electrically connected to the second shield.

C7. The system of embodiment C1, wherein the first electrode of the first set of electrodes is configured to be selectively electrically connected to the first output line; and
the first electrode of the first set of electrodes is configured to be selectively electrically connected to a second output line.

C8. The system of embodiment C1, wherein each electrode of the first set of electrodes is configured to be selectively electrically connected to the first output line, the first set of electrodes comprising multiple electrodes; and
the plurality of electrodes further comprises a second set of electrodes, each electrode of the second set of electrodes being configured to be selectively connected to a second output line, the second set of electrodes comprising multiple electrodes.

C9. The system of embodiment C8, wherein the one or more shields comprises a first set of shields and a second set of shields, each shield of the first set of shields being adjacent to and at least partially electrically isolating a respective electrode of the first set of electrodes, and each shield of the second set of shields being adjacent to and at least partially electrically isolating a respective electrode of the second set of electrodes.

C10. The system of embodiment C9, wherein a first shield of the first set of shields at least partially surrounds a first electrode of the first set of electrodes, such that the first shield comprises a first shield portion that is disposed between the first electrode and the first output line and a second shield portion that is disposed between the first electrode and the second output line.

C11. The system of embodiment C10, wherein the first shield, the first electrode of the first set of electrodes, and the second output line are disposed in a first layer, the system further comprising a supplemental shield, the supplemental shield being disposed between the first electrode of the first set of electrodes and the second output line, the supplemental shield being disposed in a second layer that is different than the first layer.

C12. The system of embodiment C9, wherein each shield of the first set of shields is configured to be selectively electrically connected to its respective electrode of the first set of electrodes, and each shield of the second set of shields is configured to be selectively electrically connected to its respective electrode of the second set of electrodes.

C13. The system of embodiment C12, wherein the shields of the first set of shields are electrically connected to one-another, and the shields of the second set of shields are electrically connected to one-another.

C14. The system of embodiment C13, wherein a driving signal is configured to be selectively applied to the first set of shields while the driving signal is not applied to the second set of shields; and the driving signal is configured to be selectively applied to the second set of shields while the driving signal is not applied to the first set of shields.

C15. The system of embodiment C1, wherein:

the first electrode of the first set of electrodes is configured to be selectively connected to a driving line that is configured to apply a driving signal; and a first output line shield is disposed between the first output line and the driving line.

C16. The system of embodiment C15, wherein the driving line extends transversely to the first output line.

C17. The system of embodiment C15, wherein the first output line is disposed in a first layer, the drive line is disposed in a second layer, and the first output line shield is disposed in a third layer, the third layer being between the first layer and the second layer.

C18. The system of embodiment C1, wherein the first electrode has multiple states, the multiple states comprising:

a detecting state in which the first electrode is connected to the first output line; and a driven state in which the first electrode receives a driving signal.

C19. The system of embodiment C18, wherein the multiple states further comprises a second detecting state, in which the first electrode is connected to a second output line.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A method for detecting a portion of a user's body, the method being performed by a system comprising a plurality of cells, each cell of the plurality of cells comprising a respective transmit electrode that is specific to that cell and a receive electrode, the plurality of cells comprising a first cell, wherein the method comprises:
   in a first timeslot:
      applying a first driving signal to the transmit electrode of the first cell; and
      receiving a first measurement signal using the receive electrode of the first cell; and
   in a second timeslot:
      applying a second driving signal to the transmit electrode of the first cell; and
      receiving a second measurement signal using the receive electrode of the first cell;
   wherein the second driving signal is inverted relative to the first driving signal.

2. The method of claim 1, wherein the plurality of cells comprises a first set of cells, the first set of cells comprising at least the first cell and a second cell, each receive electrode of the first set of cells being electrically connected to a first output line, the method further comprising:
   in the first timeslot:
      applying the second driving signal to the transmit electrode of the second cell while the first driving signal is applied to the transmit electrode of the first cell; and
      receiving the first measurement signal using the first output line, the first output line being electrically connected to the receive electrodes of both the first cell and the second cell;
   in the second timeslot:
      applying the first driving signal to the transmit electrode of the second cell while the second driving signal is applied to the transmit electrode of the first cell; and
      receiving the second measurement signal using the first output line, the first output line being electrically connected to the receive electrodes of both the first cell and the second cell.

3. The method of claim 2, wherein the plurality of cells comprises a second set of cells, wherein no driving signal is applied to the second set of cells during the first timeslot or the second timeslot.

4. The method of claim 3, wherein the first set of cells is arranged in a first linear array, the second set of cells is arranged in a second linear array, and the first linear array is adjacent to the second linear array such that each cell of the first set is adjacent to a respective cell of the second set.

5. The method of claim 2, wherein each cell of the first set of cells has a first state and a second state, wherein:
   in the first state, the transmit electrode of the respective cell is selectively connected to a first drive line that is configured to apply the first driving signal; and
   in the second state, the transmit electrode of the respective cell is selectively connected to a second drive line that is configured to apply the second driving signal.

6. The method of claim 5, wherein the method comprises:
   applying the first and second states to the first set of cells over a plurality of timeslots according to a multiplexing pattern;
   receiving a plurality of measurement signals using the first output line, wherein a respective measurement signal is received in each timeslot of the plurality of timeslots; and
   processing the plurality of measurement signals to obtain a respective measurement for each cell of the first set of cells.

7. The method of claim 6, wherein the plurality of cells comprises a second set of cells, each receive electrode of the second set being connected to a second output line, each cell of the second set of cells having a first state and a second state, wherein:
   in the first state, the transmit electrode of the respective cell of the second set is selectively connected to a first drive line of the second set that is configured to apply the first driving signal; and
   in the second state, the transmit electrode of the respective cell of the second set is selectively connected to a second drive line of the second set that is configured to apply the second driving signal;
   the method further comprising:
   applying the first and second states to the second set of cells over the plurality of timeslots according to a multiplexing pattern, the application of the first and second states to the second set of cells occurring simultaneously with the application of the first and second states to the first set of cells;

receiving a plurality of measurement signals using the second output line, wherein a respective measurement signal is received using the second output line in each timeslot of the plurality of timeslots; and processing the plurality of measurement signals received using the second output line to obtain a respective measurement for each cell of the second set of cells.

8. The method of claim 7, wherein the first output line and the second output line are connected to a common analog front end during the plurality of timeslots.

9. The method of claim 8, further comprising:
encoding the measurement signals received using the first output line and the measurement signals received using the second output line during the first plurality of timeslots, such that the encoded measurement signals are configured be combined and decoded to separate the measurement signals received using the first output line from the measurements received using the second output line.

10. The method of claim 2, the method further comprising:
obtaining measurements from at least the cells of the first set of cells in a first set of timeslots; and
obtaining measurements from one or more additional sets of cells of the plurality of cells in one or more subsequent sets of timeslots until at least one measurement has been obtained from each cell of the plurality of cells.

11. A system for detecting a portion of a user's body, the system comprising:
a plurality of cells comprising at least a first cell and a second cell, wherein:
each cell of the plurality of cells comprises a respective transmit electrode that is specific to that cell, the respective transmit electrode being configured to selectively apply a first driving signal, the respective transmit electrode being further configured to selectively apply a second driving signal that is inverted relative to the first driving signal;
each cell of the plurality of cells further comprises a respective receive electrode; and
the system is configured to:
apply, in a first timeslot, the first driving signal to the transmit electrode of the first cell; and
receive, in the first timeslot, a first measurement signal using the receive electrode of the first cell; and
apply, in a second timeslot, the second driving signal to the transmit electrode of the first cell; and
receive, in the second timeslot, a second measurement signal using the receive electrode of the first cell.

12. The system of claim 11, wherein:
the plurality of cells comprises a first set of cells, the first set of cells comprising at least the first cell and a second cell;
each receive electrode of the first set of cells is electrically connected to a first output line; and
the system is further configured to:
apply, in the first timeslot, the second driving signal to the transmit electrode of the second cell while the first driving signal is applied to the transmit electrode of the first cell; and
receive, in the first timeslot, the first measurement signal using the first output line, the first output line being electrically connected to the receive electrodes of both the first cell and the second cell;
apply, in the second timeslot, the first driving signal to the transmit electrode of the second cell while the second driving signal is applied to the transmit electrode of the first cell; and
receive, in the second timeslot, the second measurement signal using the first output line, the first output line being electrically connected to the receive electrodes of both the first cell and the second cell.

13. The system of claim 12, wherein the plurality of cells comprises a second set of cells, the system being configured to apply no driving signal to the second set of cells during the first timeslot or the second timeslot.

14. The system of claim 13, wherein the first set of cells is arranged in a first linear array, the second set of cells is arranged in a second linear array, and the first linear array is adjacent to the second linear array such that each cell of the first set is adjacent to a respective cell of the second set.

15. The system of claim 12, wherein each cell of the first set of cells has a first state and a second state, such that:
in the first state, the transmit electrode of the respective cell is selectively connected to a first drive line that is configured to apply the first driving signal; and
in the second state, the transmit electrode of the respective cell is selectively connected to a second drive line that is configured to apply the second driving signal.

16. The system of claim 15, wherein the system is configured to:
apply the first and second states to the first set of cells over a plurality of timeslots according to a multiplexing pattern;
receive a plurality of measurement signals using the first output line, wherein a respective measurement signal is received in each timeslot of the plurality of timeslots; and
process the plurality of measurement signals to obtain a respective measurement for each cell of the first set of cells.

17. The system of claim 16, wherein:
the plurality of cells comprises a second set of cells;
each receive electrode of the second set is connected to a second output line;
each cell of the second set of cells has a first state and a second state, such that:
in the first state, the transmit electrode of the respective cell of the second set is selectively connected to a first drive line of the second set that is configured to apply the first driving signal; and
in the second state, the transmit electrode of the respective cell of the second set is selectively connected to a second drive line of the second set that is configured to apply the second driving signal; and
the system is configured to:
apply the first and second states to the second set of cells over the plurality of timeslots according to a multiplexing pattern, the application of the first and second states to the second set of cells occurring simultaneously with the application of the first and second states to the first set of cells;
receive a plurality of measurement signals using the second output line, wherein a respective measurement signal is received using the second output line in each timeslot of the plurality of timeslots; and
process the plurality of measurement signals received using the second output line to obtain a respective measurement for each cell of the second set of cells.

18. The system of claim 17, wherein the first output line and the second output line are connected to a common analog front end during the plurality of timeslots.

19. The system of claim 18, wherein the system is further configured to:
- encode the measurement signals received using the first output line and the measurement signals received using the second output line during the first plurality of timeslots, such that the encoded measurement signals are configured be combined and decoded to separate the measurement signals received using the first output line from the measurements received using the second output line.

20. The system of claim 12, wherein
the system is further configured to:
- obtain measurements from at least the cells of the first set of cells in a first set of timeslots; and
- obtain measurements from one or more additional sets of cells of the plurality of cells in one or more subsequent sets of timeslots until at least one measurement has been obtained from each cell of the plurality of cells.

* * * * *